United States Patent

Shitani et al.

[11] Patent Number: 5,470,135
[45] Date of Patent: Nov. 28, 1995

[54] CONTROL DEVICE FOR AN AUTOMOTIVE VEHICLE HAVING AN ANTISKID BRAKE SYSTEM AND DIFFERENTIALS

[75] Inventors: Yuji Shitani, Hatsukaichi; Haruki Okazaki; Seiji Miyamoto, both of Hiroshima, all of Japan

[73] Assignee: Mazda Motor Corporation, Hiroshima, Japan

[21] Appl. No.: 197,593

[22] Filed: Feb. 17, 1994

[30] Foreign Application Priority Data

Feb. 17, 1993 [JP] Japan ................................. 5-027893
Dec. 21, 1993 [JP] Japan ................................. 5-321895

[51] Int. Cl.[6] ................................. B60K 17/35
[52] U.S. Cl. ................................. 303/122.03; 303/DIG. 6
[58] Field of Search ............................. 303/92, 100, 111; 180/233, 244, 249; 364/426.01, 426.02, 426.03

[56] References Cited

U.S. PATENT DOCUMENTS

| | | | |
|---|---|---|---|
| 4,765,429 | 8/1988 | Sato | 303/111 X |
| 4,770,266 | 9/1988 | Yamaguchi et al. | 180/244 X |
| 4,871,043 | 10/1989 | Fujii et al. | 303/100 X |
| 4,934,497 | 6/1990 | Ishizeki et al. | 180/233 X |
| 5,032,995 | 7/1991 | Matsuda et al. | 180/233 X |
| 5,105,903 | 4/1992 | Buschmann | 303/100 X |
| 5,170,343 | 12/1992 | Matsuda | 364/426.02 X |
| 5,172,959 | 12/1992 | Eickhoff et al. | 303/92 X |

FOREIGN PATENT DOCUMENTS 61-287824 12/1986 Japan.

Primary Examiner—Robert J. Oberleitner
Assistant Examiner—Lee W. Young
Attorney, Agent, or Firm—Fish & Richardson

[57] ABSTRACT

A control device for an automotive vehicle comprises a differential disposed between wheels or wheel axles of a vehicle an antiskid brake control device to control an antiskid brake device which is capable of adjusting a brake pressure applied to a brake device of the vehicle to prevent wheels of the vehicle from locking, a differential limiting control device having a differential limiting device being capable of controlling and transferring a differential limit to the differential, and operating to decrease the differential limit while the antiskid brake device is operating, such that when either the antiskid brake control device or said differential control device fails, the non-failing control device receives a failure signal from the failing control device and the non-failing control device controls the vehicle towards a stable condition or increases a brake force.

21 Claims, 25 Drawing Sheets

| Fakro | MU | VEHICLE SPEED Vas | TABLE |
|---|---|---|---|
| 1 | 3 | HIGH SPEED RANGE | HM1 |
| | | MIDDLE SPEED RANGE | HM2 |
| | | LOW SPEED RANGE | HM3 |
| 0 | 3 | HIGH SPEED RANGE | HM1 |
| | | MIDDLE SPEED RANGE | HM2 |
| | | LOW SPEED RANGE | HM3 |
| | 2 | HIGH SPEED RANGE | MM1 |
| | | MIDDLE SPEED RANGE | MM2 |
| | | LOW SPEED RANGE | MM3 |
| | 1 | HIGH SPEED RANGE | LM1 |
| | | MIDDLE SPEED RANGE | LM2 |
| | | LOW SPEED RANGE | LM3 |

FIG.14

| TABLE | B'₁₂ | B'sg | B'₃₅ | B'sz |
|---|---|---|---|---|
| HM1 | −1.5G | 95% | 0G | 95% |
| HM2 | −1.5G | 90% | 0G | 90% |
| HM3 | −1.5G | 85% | 0G | 85% |
| MM1 | −1.0G | 95% | 0G | 95% |
| MM2 | −1.0G | 90% | 0G | 90% |
| MM3 | −1.0G | 85% | 0G | 85% |
| LM1 | −0.5G | 95% | 0G | 95% |
| LM2 | −0.5G | 90% | 0G | 90% |
| LM3 | −0.5G | 85% | 0G | 85% |

FIG. 15

| MU | Fakro | STEERING ANGLE | $B_{12}$ | $B_{sg}$ | $B_{35}$ | $B_{sz}$ |
|---|---|---|---|---|---|---|
| 1.2 | | <90° | $B'_{12}$ | $B'_{sg}$ | $B'_{35}$ | $B'_{sz}$ |
| | | ≥90° | $B'_{12}$ | $B'_{sg}+5\%$ | $B'_{35}$ | $B'_{sz}+5\%$ |
| 3 | 0 | <90° | $B'_{12}$ | $B'_{sg}$ | $B'_{35}$ | $B'_{sz}$ |
| | | ≥90° | $B'_{12}$ | $B'_{sg}+5\%$ | $B'_{35}$ | $B'_{sz}+5\%$ |
| | 1 | <90° | $B'_{12}-1.0G$ | $B'_{sg}-5\%$ | $B'_{35}$ | $B'_{sz}-5\%$ |
| | | ≥90° | $B'_{12}-1.0G$ | $B'_{sg}-5\%$ | $B'_{35}$ | $B'_{sz}$ |
| DIFF FAIL | | | $B'_{12}-0.3G$ | $B'_{sg}-5\%$ | $B'_{35}-0.3G$ | $B'_{sz}-5\%$ |

FIG.16

| MANUAL SWITCH | DIFF | CONTENTS OF CONTROL (CURRENT VALUE OF DIFF) |
|---|---|---|
| AUTO (A-MODE) | FRONT | UN-LOCK (If=0) |
| | CENTER | AUTO-MODE CONTROL |
| | REAR | AUTO-MODE CONTROL |
| C (C-MODE) | FRONT | UN-LOCK (If=0) |
| | CENTER | FULL-LOCK (Ic=MAXIMUM) |
| | REAR | AUTO-MODE CONTROL |
| R (R-MODE) | FRONT | UN-LOCK (If=0) |
| | CENTER | FULL-LOCK (Ic=MAXIMUM) |
| | REAR | FULL-LOCK (Ir=MAXIMUM) |
| F (F-MODE) | FRONT | FULL-LOCK (If=MAXIMUM) |
| | CENTER | FULL-LOCK (Ic=MAXIMUM) |
| | REAR | FULL-LOCK (Ir=MAXIMUM) |

FIG. 27

| MANUAL SWITCH | CONDITION | CONTENTS OF CONTROL |
|---|---|---|
| AUTO (A-MODE) | BRAKE SIGNAL "ON" | ALL DIFFS ARE "UN-LOCK" CONDITION (If=Ic=Ir=0) |
| C (C-MODE) | BRAKE SIGNAL "ON" | FR. AND RE. DIFFS ARE "UN-LOCK" (If=Ir=0) CE. DIFF IS "MIDDLE LOCK" CONDITION (Ic=MIDDLE VALUE; WITHIN 0.2 SECOND) |
| | ANTISKID BRAKE CONTROL SIGNAL "ON" | FR. AND RE. DIFFS ARE "UN-LOCK" (If=Ir=0) CE. DIFF IS "UN-LOCK" (Ic=0 WITHIN 0.2 SECOND) |
| R (R-MODE) | BRAKE SIGNAL "ON" | FR. DIFF IS "UN-LOCK" CONDITION (If=0) CE. AND RE. DIFFS ARE "UN-LOCK" CONDITION (Ic and Ir=MIDDLE VALUE) |
| | ANTISKID BRAKE CONTROL SIGNAL "ON" | ALL DIFFS ARE "UN-LOCK" CONDITION (If=Ic=Ir=0) |
| F (F-MODE) | ANTISKID BRAKE CONTROL IS NOT CARRIED OUT | |

FIG. 28

CONTROL DEVICE FOR AN AUTOMOTIVE VEHICLE HAVING AN ANTISKID BRAKE SYSTEM AND DIFFERENTIALS

BACKGROUND OF THE INVENTION

1. Field of the Invention

The present invention relates to a control device for an automotive vehicle, and more particularly to a control device for an automotive vehicle installed with a differential, a differential control device and an antiskid brake system wherein upon failure of the differential control device or the antiskid brake system, a failure signal is sent by the failing device to the non-failing device so that the non-failing device can control the vehicle.

2. Discussion of the Related Art

In general, an automotive vehicle has a differential device to prevent the wheels from slipping even when the difference in wheel speed between right and left wheels is due to a difference between tracks of right and left wheels, to improve vehicle safety.

The differential device is disposed between an engine and the wheels for absorbing a difference in speed between the right and left wheels.

In a front wheel drive vehicle, a front differential device is disposed between the front right and left wheels. In a rear wheel drive vehicle, a rear differential device is disposed between the right and left rear wheels. In a four wheel drive vehicle, in addition to having front and rear differential devices, a center differential device is disposed between the front and rear axles.

A differential limiting device is known in the art to control the power of the differential which restricts the operation of the differential device, and thereby properly transfers the engine output torque to each of the wheels.

Additionally, antiskid brake systems are known in the art which prevent the wheels from locking while the vehicle is braking, and prevent the wheels from slipping. For example, when the wheels suddenly receive a braking force from a brake device of the vehicle, the antiskid brake system reduces the braking pressure on the brake system to reduce the brake force and prevent the wheels from locking just before the wheels are locked, and then it increases the brake pressure again. The antiskid brake system repeats this process until the vehicle stops.

Generally, a vehicle equipped with an antiskid brake system can prevent the wheels from locking and stop in the shortest distance even if the brakes are suddenly applied in icy or snowy driving conditions.

In a vehicle equipped with both an antiskid brake system and a differential limiting device, the front wheels and rear wheels of the vehicle rotate as one and become the same rotational speed if the center differential device locks during the antiskid brake system operation. When this happens, the front and rear wheels mutually interfere so that the antiskid brake system can not detect actual slip conditions of the front and rear wheels. Therefore, it is difficult to independently control the brake pressure of the front and rear wheels corresponding to the slip conditions of both sets of wheels.

Attempts have been made to solve this problem, for example, Japanese Laid-Open Patent Publication 61-287824 discloses that a control device which controls the power of the center differential (of the vehicle equipped with both an antiskid brake system and a differential limiting device) is switched to an un-control condition while the antiskid brake system is operating so that the antiskid brake system can be effective.

In this system, however, when the differential limiting device fails in the locked condition it is not able to be released, and the locked condition will continue while the antiskid brake system is in operation. Thus, there is a possibility that the control device will unnecessarily reduce brake pressure on one or more wheels. Thus, the vehicle may become unstable because all four wheels may lock, or the torque between the driving wheels may become excessive.

Additionally, when the antiskid brake system fails, it is desirable to control the vehicle stability and braking functions by controlling the vehicle differentials.

SUMMARY OF THE INVENTION

A first aspect of the invention is to provide an automotive vehicle control device equipped with an antiskid brake control device and a differential limiting control device which is able to properly control the vehicle when either the antiskid brake control device or the differential limiting control device fails. Further, when either the antiskid brake control device or the differential limiting control device fails, the non-failing device is able to properly control the vehicle in place of the device which has failed.

This first object is accomplished by providing a control device for an automotive vehicle comprising the following elements: a differential device, an antiskid brake control device and a differential limiting control device.

The differential device is disposed between the wheels or wheel axles to absorb a difference in rotational speed between the wheels or the wheel axles.

The antiskid brake control device has an antiskid brake device to prevent the wheels of the vehicle from locking while a brake device of the vehicle operates and controls the antiskid brake device.

The differential limiting control device has a differential limiting device and a differential device which transfers power to the wheels. The differential limiting device is disposed between either the wheels or the wheel axles depending on the type of vehicle. The differential limiting control device controls the power of the differential limiting device to decrease the power of the differential device while the antiskid brake device is operating.

When either the antiskid brake control device or the differential limiting control device fails, a failure signal is sent to the non-failing control device to inform the non-failing device of the failure of the other control device and to shift control of the vehicle to the non-failing device to achieve either stability of the vehicle or to increase the vehicle brake force.

The non-failing control device is thus able to properly control and take over the functions of the failing control device even upon failure of either the antiskid brake device or the differential limiting device.

A second aspect of the invention relates to the differential control device changing the control to increase the power of the differential limit after the differential limiting device receives a failure signal from the antiskid brake control device.

Thus, according to the second aspect of the invention, the control device is allowed to calculate an actual vehicle speed from a normal wheel speed detecting sensor and to maintain the brake effect by causing all wheels to become the same rotational speed.

A third aspect of the invention relates to the differential control device prohibiting power from being transmitted to the differential device after the differential control device receives a failure signal from the antiskid brake control device.

Thus, the third aspect of the invention improves the steering of the vehicle by prohibiting power from being transmitted to the differential device.

A fourth aspect of the invention relates to the differential control device releasing one differential device from the locked condition before releasing another differential device from the locked condition where the vehicle has more than one differential device.

In this manner, the fourth aspect of the invention, prohibits the rear wheels from becoming locked before the front wheels are locked and thus improves the steering of the vehicle.

A fifth aspect of the invention the differential control device choosing to control the vehicle either by increasing the differential limit or by prohibiting power from being transmitted to the differential device after the differential control device receives a failure signal from the antiskid brake control device.

Thus, according to the fifth aspect of the invention, by allowing the differential control device to choose the control method, when the vehicle has a high speed or the road friction coefficient is low, safer driving conditions can result. Further, when the vehicle has a low speed or the road friction coefficient is high, the control device can help provide the shortest brake distance.

A sixth aspect of the invention relates to the antiskid brake control device increasing the brake force after the antiskid brake control device receives a failure signal from the differential control device.

According to the sixth aspect of the invention, the control device maintains the antiskid brake control device in as normal a condition as possible so that brake force can be transferred to the wheels.

A seventh aspect of the invention relates to an antiskid brake control device which has a threshold control device for changing the threshold of the antiskid brake control device and the threshold control device shifts the threshold to a second threshold value which allows the wheels to be locked when the antiskid brake control device receives the failure signal of the differential limiting control device.

Thus, according to the seventh aspect of the invention, the control device can cause the brake force applied to the wheels to be higher than the usual level applied during normal control.

An eighth aspect of the invention relates to an antiskid brake control device having a threshold control device to change a threshold of the antiskid brake control and to change the brake pressure during operation of the antiskid brake. The threshold control device shifts the threshold value to a second threshold value which makes it difficult to start antiskid brake control upon receipt of a failure signal from the differential limiting control device.

According to the eighth aspect of the invention, by changing the threshold value, it is more difficult to begin operation of the antiskid brake control device, and the control device can apply greater brake force to the wheels than under normal control.

A ninth aspect of the invention relates to the antiskid brake control device prohibiting antiskid brake control after the antiskid brake control device receives a failure signal from the differential control device.

According to the ninth aspect of the invention, operation of the antiskid brake control device is prohibited so that all wheels will not be locked at the same time and so that torque between the wheels will not become excessive.

The above objects and features of the present invention will be apparent to those skilled in the art from the following description of the preferred embodiments thereof when considered in conjunction with the appended drawings.

BRIEF DESCRIPTION OF THE DRAWINGS

The above objects and features of the present invention will be apparent to those skilled in the art from the following description of the preferred embodiments thereof when considered in conjunction with the appended drawings in which:

FIGS. 14, 15 and 16 are tables of control threshold levels.

FIGS. 27 and 28 are tables showing the different modes of the control of the differentials.

DETAILED DESCRIPTION OF THE PREFERRED EMBODIMENTS

The invention will now be described in detail with reference to the drawings.

Figure 1:
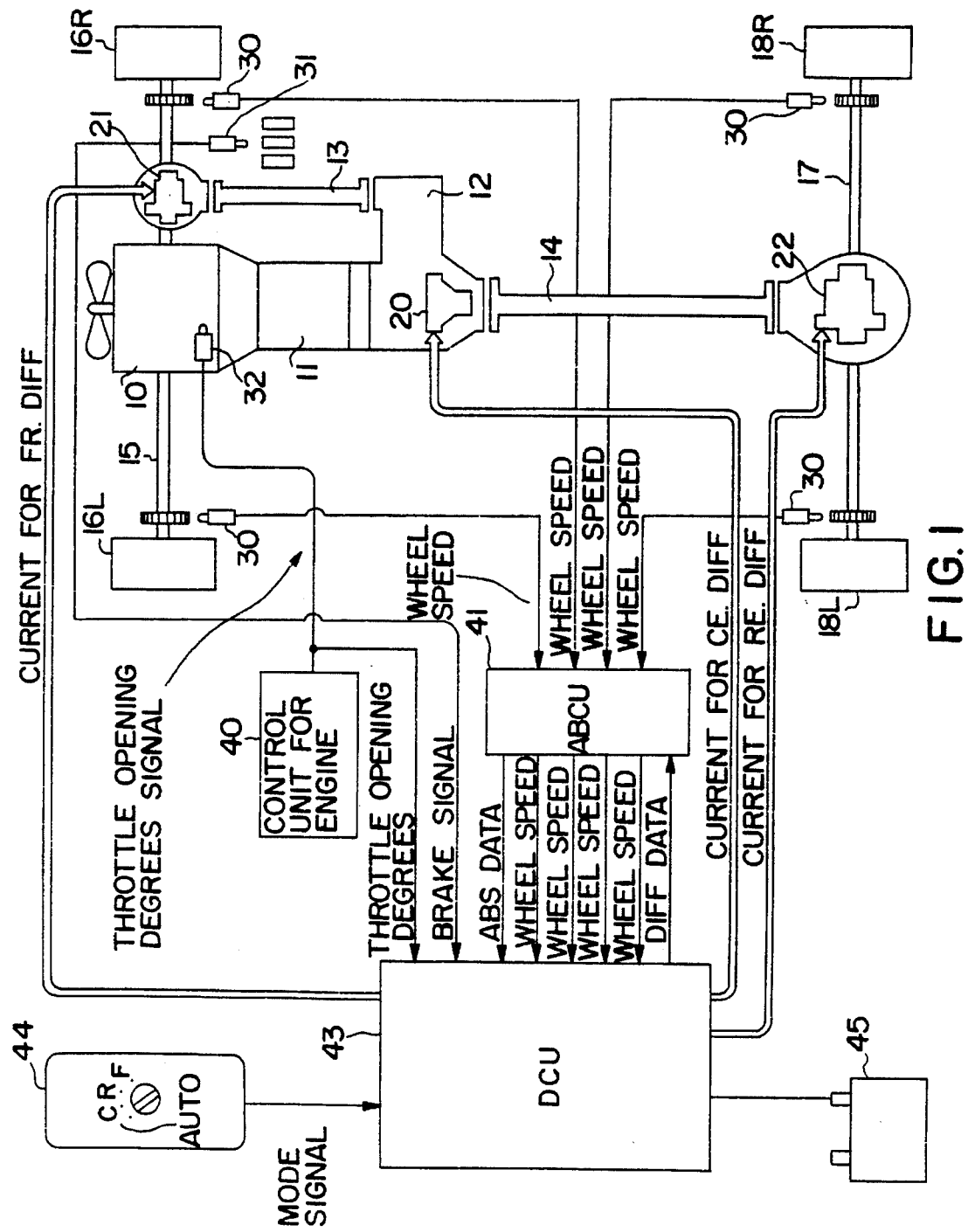
FIG. 1 is a schematic diagram showing the whole arrangement of an engine output torque transfer system according to a preferred embodiment of the invention.

As shown in FIG. 1, in a four wheel drive vehicle, the engine 10 is connected to a transmission 11 which is connected to a transfer device 12. The transfer device 12 is connected to front and rear propeller shafts 13 and 14.

The front end portion of the front shaft 13 is connected to front axle 15 by way of front differential 21. Output torque from the engine 10 is thus transferred to right and left front wheels 16R and 16L by way of transmission 11, transfer device 12, front shaft 13, front differential 21 and front axle 15.

Similarly, the rear end portion of rear shaft 14 is connected to rear axle 17 by way of rear differential 22. Output torque from the engine 10 is thus transferred to right and left rear wheels 18R and 18L by way of transmission 11, transfer device 12, rear shaft 14, rear differential 22 and rear axle 17.

Front and rear differentials 21 and 22 can mechanically absorb a difference in rotational speed between the front wheels 16L and 16R or the rear wheels 18L and 18R. Additionally, differentials 21 and 22 can control the distribution of output torque from engine 10 to each of wheels 16L, 16R, 18L and 18R by way of propeller shafts 13 and 14.

Transfer device 12 has s center differential 20 for controlling the distribution of torque between the front and rear wheels.

Wheel speed detecting sensors 30 are positioned adjacent wheels 16L, 16R, 18L and 18R respectively. The wheel speed signal of each sensor 30 is sent to an antiskid brake control unit 41 (identified in the Figs. as "ABCU") for controlling an antiskid brake device.

Throttle sensor 32 is positioned on engine 10 and measures the throttle opening in degrees. This measurement is sent to engine control unit 40.

Brake switch 31 detects whether the brakes have been applied and is disposed on the front side of the vehicle body. Brake switch 31 sends a signal to a differential control unit 43 (identified in the Figs. as "DCU"), which is connected to battery 45 and manual switch 44 for selecting modes of differential lock conditions.

In addition to the brake signal of brake switch 31, differential control unit 43 also receives a signal from throttle sensor 32 indicating the throttle opening, wheel speed signals from all wheel speed detecting sensors 30, a mode signal from manual switch 44 and an antiskid brake data signal from antiskid brake control unit 41. The signal from the antiskid brake control unit includes a signal indicating whether the antiskid brake control unit is operational, whether there is a failure in the antiskid brake device and the type of failure.

Differential control unit 43 calculates a current value for controlling the front, center and rear differentials 21, 20, and 22 according to the above input signals and sends the current to each of them. The power of each differential is thus controlled according to the current from the differential control unit, so that the differential control unit 43 can control the differential lock condition.

Further, differential control unit 43 sends antiskid brake control unit 41 a differential data signal. This signal comprises a signal for informing the antiskid brake control unit of the condition of differentials 20, 21 and 22, a signal which indicates that there is a failure in the differential limiting device or in a differential, and a signal which indicates the content of the failure.

Figure 2:
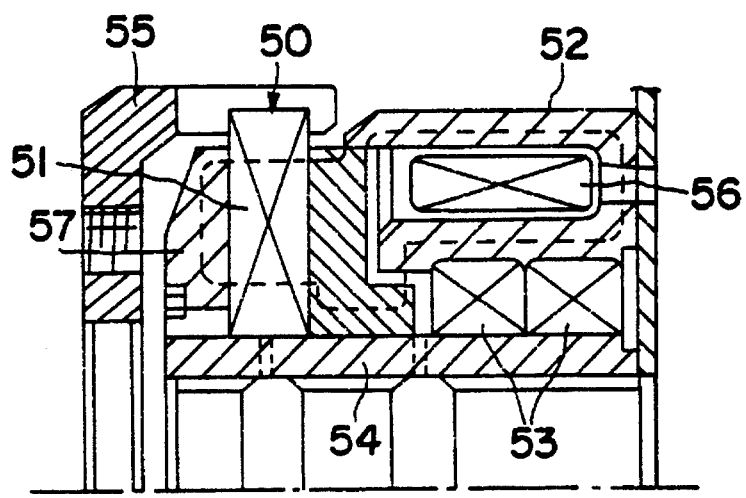
FIG. 2 is an cross-sectional view of an electro-magnetic multiple disc clutch in accordance with the embodiment of the present invention.

As shown in FIG. 2, each of differentials 20, 21 and 22 is equipped with an electro-magnetic multiple disc clutch 50 which can control the lock condition of the differential based on the clutch condition between the multiple discs.

Multiple disc clutch 50 comprises clutch disc unit 51 having a plurality of inner discs and a plurality of outer discs, actuator 52 for applying pressure to clutch disc unit 51, first transfer member 54 for connection to propeller shaft 13 or 14, bearings 53 for supporting first transfer member 54, and second transfer member 55 for connection to the other propeller shaft 13 or 14.

Actuator 52 comprises solenoid 56 and armature 57. When solenoid 56 receives current from differential control unit 43, armature 57 pushes clutch disc unit 51 according to a magnetic force of the solenoid 56. Thus, clutch 50 is controlled by differential control unit 43.

In the electro-magnetic multiple disc clutch 50, the amount of current applied to solenoid 56 is directly proportional to the amount of friction between the inner and the outer discs of clutch disc unit 51. Thus, the speed of the differential can change continuously according to the current gain and loss.

As shown in FIG. 27, each of front, center and rear differentials 21, 20, and 22 has four modes, A-mode, C-mode, R-mode and F-mode, which can be selected by a driver of the vehicle using manual switch 44. As shown in the third column of FIG. 27, when the control is in an unlocked condition, the value of the current supplied to the electro-magnetic multiple disc clutch 50 is 0 and when the control is in a full-locked condition, the value of the current supplied is a maximum.

When A-mode is selected, the front differential is set in the unlocked position and the front wheels are disengaged. In this mode the front wheels contribute little to vehicular motion and the vehicle will handle better. A-mode is thus suitable for on road driving.

When F-mode is selected, differentials 20, 21 and 22 are all set in the full-locked position so that vehicle traction is superior. Therefore, F-mode is suitable for off road driving.

Both the C-mode and the R-mode have characteristics somewhere between A-mode and F-mode. C-mode and R-mode are also selected by the driver.

The overall control mode is accomplished by initially determining the vehicle body speed based on the wheel speed sensors. Then the differential speeds for the center, front and rear differentials are determined. Following these calculations, the current for the center, front and rear differentials are calculated. Then the amount of the control is calculated and the main program repeats.

The control by the differential control unit of the current of the electro-magnetic multiple disc clutch 50 will now be described with particular reference to FIGS. 3–5.

First, differential control unit 43 calculates the wheel speeds Nfl, Nfr, Nrl, and Nrr of wheels 16L, 16R, 18L and 18R respectively, according to the input signal from each wheel speed detecting sensor 30. These values are then mutually compared, and differential control unit 43 determines if one wheel is slipping and which one it is.

Further, differential control unit 43 calculates the differential speeds of differential 20, 21 and 22 based on the values Nfl, Nfr, Nrl and Nrr.

Figure 3:
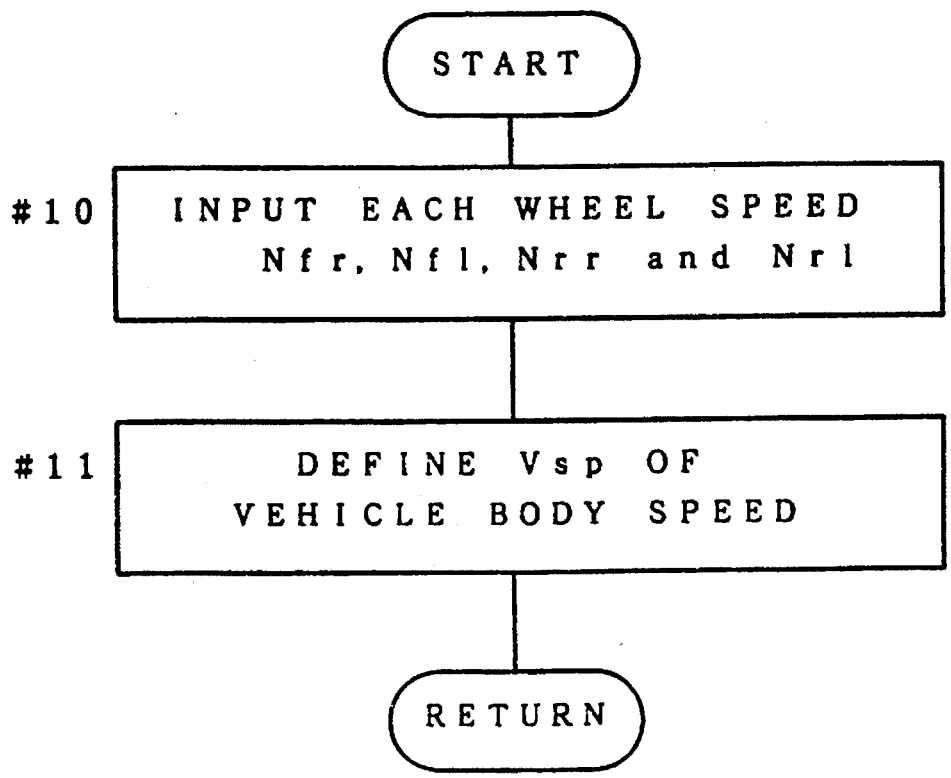
FIG. 3 is a flowchart of a subroutine program for calculating a vehicle body speed.

As shown in FIG. 3, differential control unit 43 defines the vehicle body speed Vsp as the smallest of values Nfl, Nfr, Nrl and Nrr (step 11).

Figure 4:
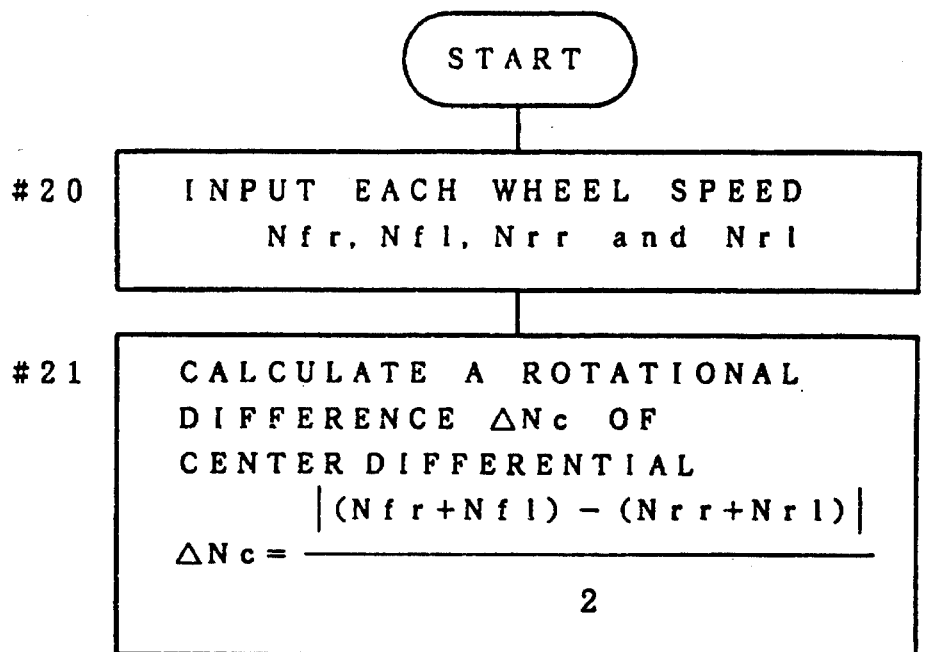
FIG. 4 is a flowchart of a subroutine program for calculating a differential speed of a center differential device of a vehicle.

As shown in FIG. 4, differential control unit 43 calculates the differential speed of center differential 20 by inputting the speed of each wheel Nfl, Nfr, Nrl and Nrr, (step 20) and then calculating the differential speed $\Delta Nc$ of center differential 20, which is the difference between the average speeds of the front and rear wheels (step 21).

Figure 5:
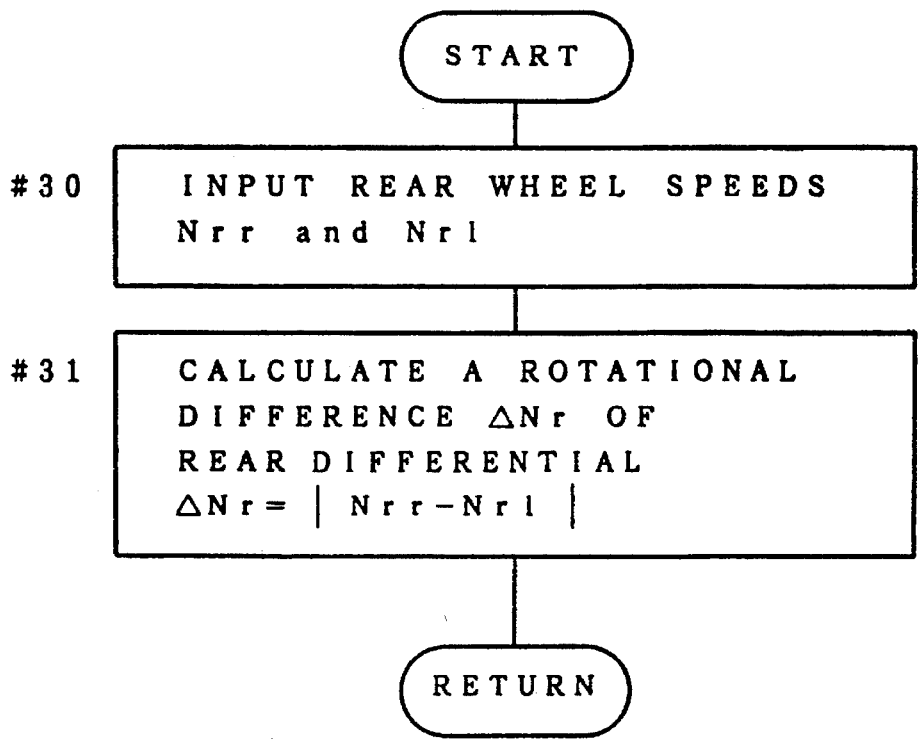
FIG. 5 is a flowchart of a subroutine program for calculating a differential speed of a rear differential device of a vehicle.

Further, as shown in FIG. 5, differential control unit 43 calculates the differential speed $\Delta Nr$ of rear differential 22 by inputting rear wheel speeds $\Delta Nrl$ and Nrr (step 30), and then calculating the differential speed $\Delta Nr$, equal to the difference between the speeds of the right and left rear wheels 18R and 18L (step 31).

Similarly, differential control unit 43 calculates the differential speed $\Delta Nf$ of front differential 21, using substantially the same formula used to calculate $\Delta Nr$ by substituting Nfl and Nfr for Nrl and Nrr respectively.

Differential control unit 43, then calculates the current to be sent to solenoids 56, contained in the multiple disc clutches of the front, center and rear differentials 21, 20 and 22, according to speeds $\Delta Nf$, $\Delta Nc$ and $\Delta Nr$.

The preferred current calculation case will now be described using the center differential as an example, with particular reference to FIGS. 6–8.

Figure 6:
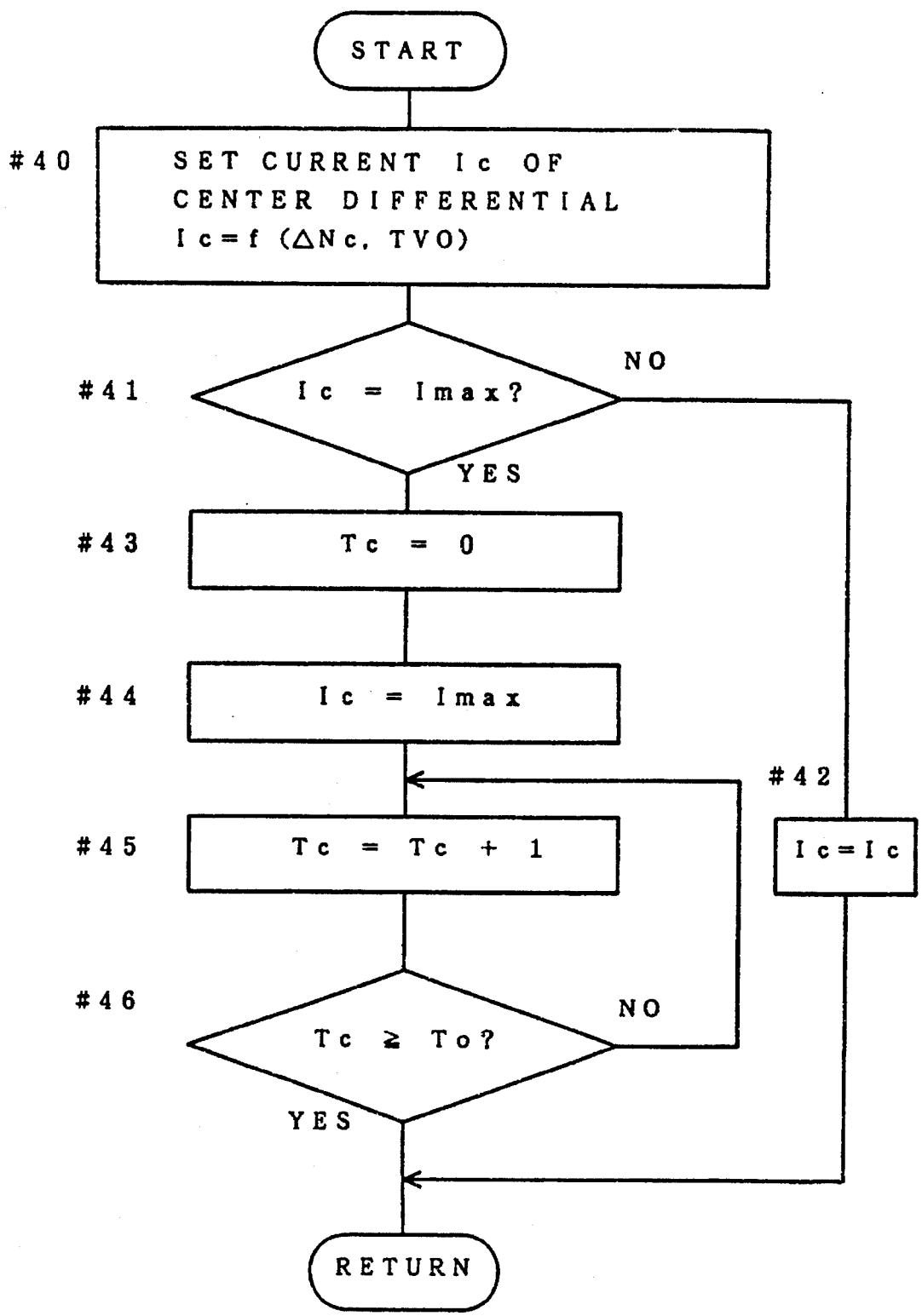
FIG. 6 is a flowchart of a program for determining the level of electric current sent to a center differential device during an auto-mode control.

As shown in FIG. 6, center differential current Ic to be supplied to center differential 20, is first calculated as a function of the center differential speed $\Delta Nc$ and the throttle valve opening TVO (step 40).

When either $\Delta Nc$ or TVO becomes a maximum current value Imax, the center differential current Ic is set to Imax. However, if both $\Delta Nc$ and TVO are equal to or smaller than the value of Imax, the center differential current Ic is calculated by a predetermined formula as shown below. The current values I1 and I2 which are input into the formula.

$$Ic = I1 \times K_1 + I2 \times K_2$$

where $k_1$ and $k_2$ are predetermined constants and $k_1$ relates to a stable driving condition and $k_2$ relates to an aggressive driving condition. Therefore depending on the type of vehicle, $k_1$ and $k_2$ are set. For example, if the vehicle is a sports car, $k_2$ is increased; but if the vehicle is a sedan, $k_1$ is increased.

Figure 7:
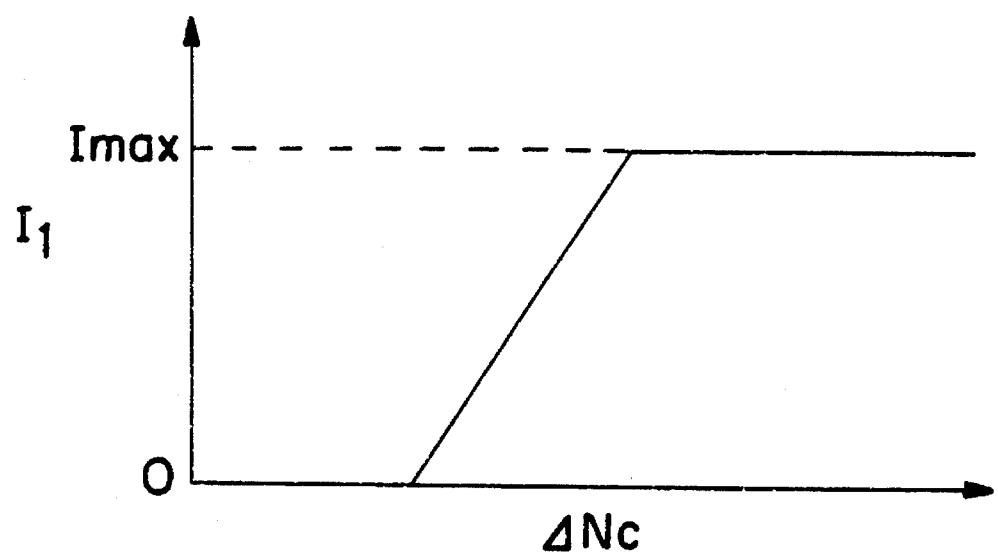
FIG. 7 is a graph showing the relationship between the current and the differential speed of the center differential device.
Figure 8:
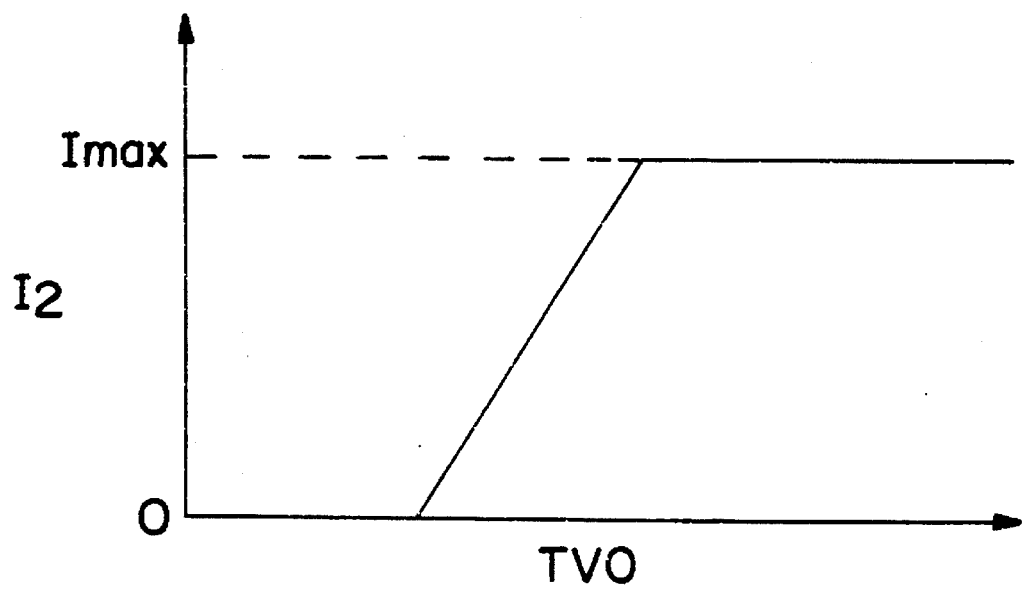
FIG. 8 is a graph showing the relationship between the current and the degree to which a throttle valve is open.

With regard to FIG. 7, in one embodiment, Imax is approximately 3 amps; however, this value will be changed depending on the type of differential used in the vehicle. The current value I1 begins to increase as the center differential speed reaches approximately 50 rpm and I1 continues to increase until the center differential speed reaches 150–200 rpms. This value is set based on a condition of aggressive driving and stability. With regard to FIG. 8, in one embodiment, the current value I2 begins to increase when the throttle valve opening has opened ¼ of the way to a full open position and continues to increase until the throttle valve is open ½–¾ of the way to the full open position.

Next, Ic is compared with Imax to determine whether Ic is equal to or less than the maximum current value Imax (step 41). If Ic is not equal to Imax, Ic is set equal to Ic (step 42). This indicates that the center differential 20 is set to a MIDDLE-LOCK condition, between the UN-LOCK and FULL-LOCK conditions. When Ic is 0, the center differential 20 is in the UN-LOCK condition.

When Ic is equal to Imax, a counter is set (step 43) and Ic is set to Imax (step 44). Therefore, the wheels are prevented from repeatedly slipping by the counter which keeps the torque value constant during a predetermined term. At this time, center differential 20 is in the FULL-LOCK condition.

Counter Tc is then incremented (step 45) and compared with a predetermined time To to determine whether a predetermined amount of time has passed (step 46). Therefore, when differential speed $\Delta Nc$ of center differential 20 increases suddenly, the differential control unit 43 sets center differential 20 to the FULL-LOCK position for a predetermined period of time.

A detailed explanation of the control of front and rear differentials 21 and 22 has been omitted because the control of these differentials is substantially the same as the above described control of center differential 20.

Referring now to FIG. 28, a preferred control will be described for the situation where the brake switch 31 and antiskid brake device operate normally.

The antiskid brake device detects a skidding or slipping wheel by comparing the vehicle body speed and the wheel speed. The antiskid brake device controls the brake force of the wheels respectively to cancel the wheel lock condition corresponding to the grade of the skid condition of the wheel during the braking operation. When at least one of front, center and rear differentials 21, 20 and 22 is in the FULL-LOCK condition, it is difficult to ascertain the actual vehicle body speed from the wheel speed. Therefore, it is difficult to properly control the antiskid brake control.

Thus, when both brake switch 31 and the antiskid brake device operate normally, the differential limiting control of differentials 20, 21, and 22 is carried out based on the map disclosed in FIG. 28.

In A-mode, when brake switch 31 is on, differentials 20, 21 and 22 are unlocked.

In C-mode, when the brake switch 31 is on, front and rear differentials 21 and 22 are unlocked and center differential 20 is set to the MIDDLE-LOCK condition within 0.2 seconds from when the brake signal input was received from the brake switch 31. Additionally, when the antiskid brake device is on or starts to operate, the center differential 20 is unlocked within 0.2 second.

In R-mode, when the brake signal from the brake is on, front differential 21 is unlocked and center and rear differentials are set to the MIDDLE-LOCK condition. Therefore, the maximum power of the center and rear differentials 20 and 22 is reduced. Further, when the antiskid brake device starts to operate, the center and rear differentials are unlocked.

The preferred brake control system of the vehicle in this embodiment will now be described referring particularly to FIG. 9.

Figure 9:
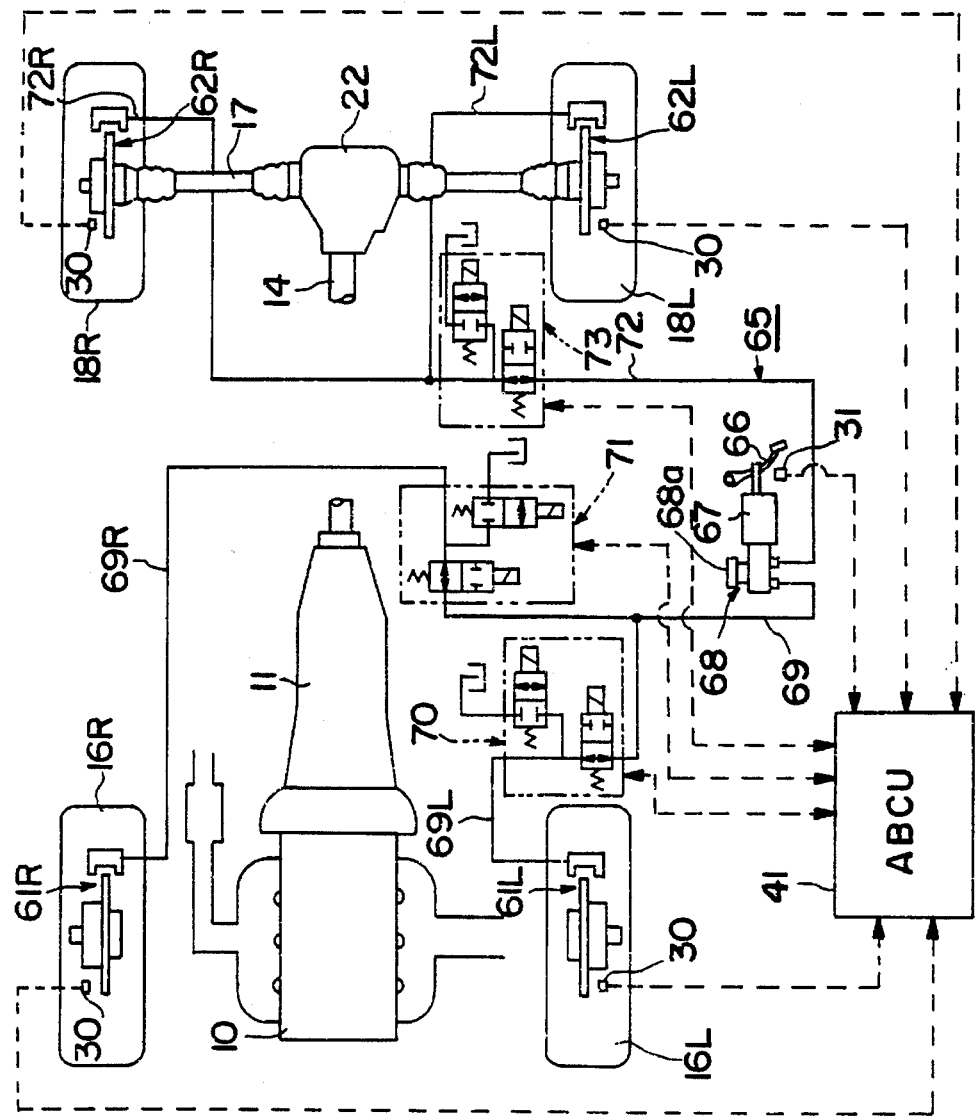
FIG. 9 is a schematic diagram showing one arrangement of a brake control system used by the invention.

As shown in FIG. 9, each of the wheels 16L, 16R, 18L and 18R is equipped with brake devices 61L, 61R, 62L and 62R respectively comprising a disc which rotates with the wheel and a caliper to brake the disc rotation based on the brake pressure. Brake control system 65 comprises a brake pedal 66, a master cylinder 68 for generating the brake pressure corresponding to a brake force applied to the brake pedal and a brake booster 67 which operates brake devices 61L, 61R, 62L, and 62R and increases the amount of pressure in the brake system, as determined by the operation of brake pedal 66 and master cylinder 68.

Brake pressure supply line 69 for the front wheels is connected to the master cylinder 68 and extends to the calipers of the brake device 61L and 61R. Brake pressure supply line 69 has a left brake pressure supply line 69L for supplying the pressure to the left brake device 61L and a right brake pressure supply line 69R for supplying the pressure to the right brake device 61R. Further, the left brake pressure supply line 69L has a first valve unit 70 comprising an electro-magnetic open and close valve and an electro-magnetic relief valve. The right brake pressure supply line 69R has a second valve unit 71 comprising an electro-magnetic open and close valve and an electro-magnetic relief valve.

Brake pressure supply line 72 for the rear wheels is connected to the master cylinder 68 has a third valve unit 73 comprising an electro-magnetic open and close valve and an electro-magnetic relief valve.

Brake pressure supply line 72 is also separated to a left brake pressure supply line 72L and a right brake pressure supply line 72R downstream of the third valve unit 73. These brake pressure supply lines 72L and 72R are connected to brake calipers of the rear wheels 18L and 18R respectively.

The brake control system of this embodiment has a first channel for variably controlling the brake pressure of the brake device 61L of the left front wheel 16L based on the operation of the first valve unit 70, a second channel for variably controlling the brake pressure of the brake device 61R of the right front wheel 16R based on the operation of the second valve unit 71 and a third channel for variably controlling the brake pressure of the brake devices 62L and 62R of the rear wheels 18L and 18R based on the operation of the third valve unit 73.

The antiskid brake control unit 41 controls the first, second and third channels in the above brake control system independently. The antiskid brake control unit 41 receives a signal from the brake switch 31 to detect whether the brake pedal 66 has been activated by the driver, signals from all of the wheel speed detecting sensors 30, indicating the speed of each of the wheels, and outputs from the brake pressure control signals calculated by the above input signals to the first, second and third valve units 70, 71 and 73 respectively. In this manner, antiskid brake control unit 41 can control the slip of all of the wheels 16L, 16R, 18L and 18R respectively at the same time.

The antiskid brake control unit 41 simultaneously controls the open and close valves and the relief valves of the first, second and third valve units 70, 71 and 73 respectively, so that antiskid brake control unit 41 can provide the proper brake force to all of the wheels 16L, 16R, 18L and 18R according to the slip condition of each wheel.

Brake oil released from the relief valves of the first, second and third valve units 70, 71 and 73 is returned to a reserve tank 68A of the master cylinder 68 by way of a drain line (not shown).

When the antiskid brake control unit 41 is not on, each relief valve of the first, second and third valve units 70, 71 and 73 closes and remains in that position, and each of the open and close valves of valve units 70, 71 and 73 opens and remains in that position. Accordingly, when the driver operates the brake pedal 66, the brake pressure generated by the master cylinder 68, is supplied to the brake device 61L, 61R, 62L and 62R and is applied to the wheels 16L, 16R, 18L and 18R directly.

Figure 10:
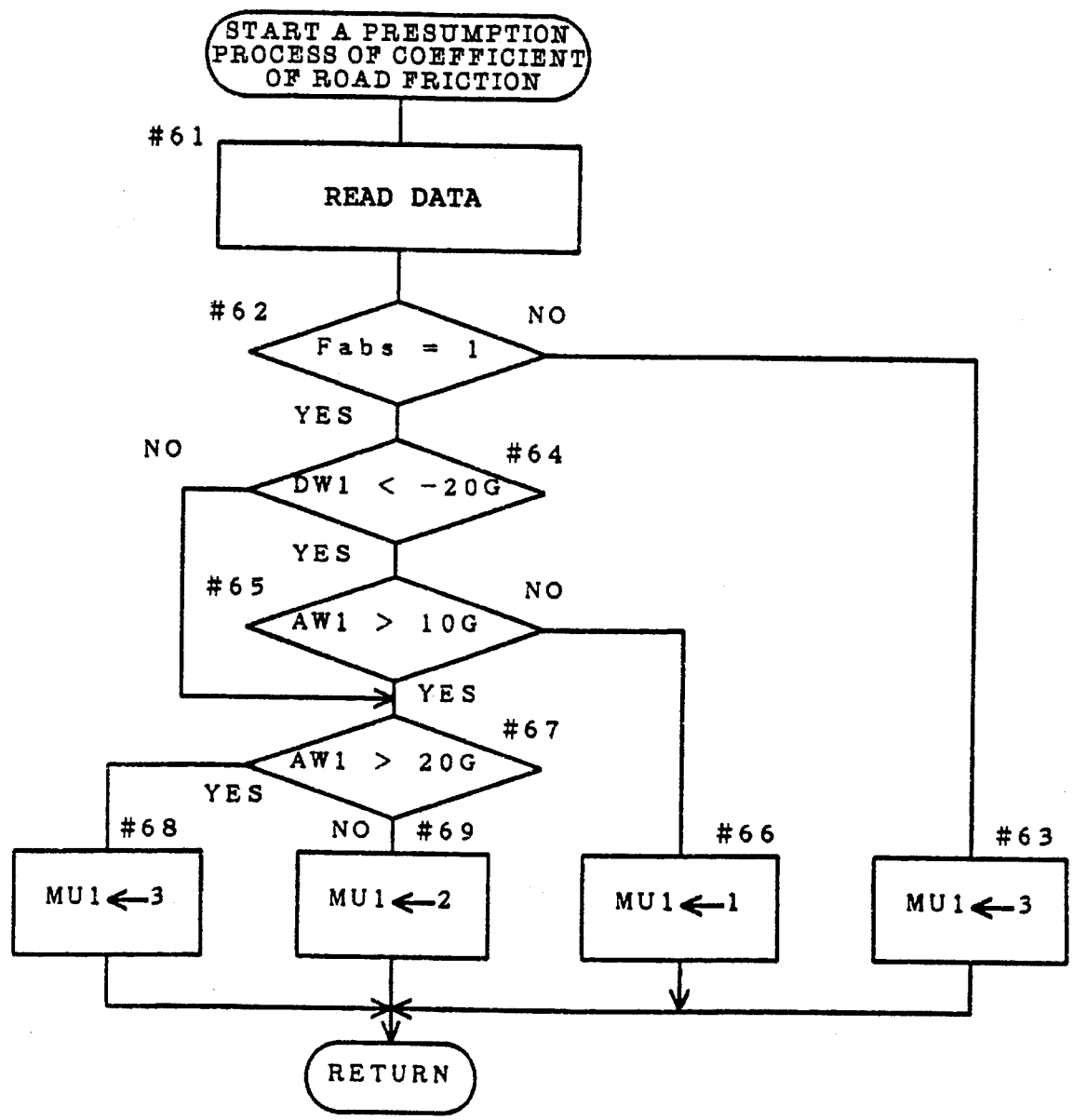
FIG. 10 is a flowchart of an antiskid brake control system explaining the process which determines the coefficient of road friction in accordance with an embodiment of the present invention.

Referring now in addition to FIG. 10, antiskid brake control unit 41 calculates an acceleration and a deceleration of each wheel based on the wheel speeds measured by wheel speed sensors 30. To do this, the antiskid brake control unit 41 preferably calculates a difference between the last known and present values of the wheel speed every sampling cycle $\Delta t$ (for example; 7 ms) and converts the difference into a gravitational acceleration as a present acceleration value or a present deceleration value.

The antiskid brake control unit 41 then evaluates if the road condition is OFF-ROAD by carrying out a predetermined off-road evaluation process. For example, if the acceleration or deceleration of the rear wheels is above or below respective predetermined values but does not exceed a predetermined number of times during a predetermined term, the antiskid brake control unit 41 evaluates that present road condition is ON-ROAD and sets a flag Fakro to 0.

If the number of times the acceleration or deceleration of the rear wheels is above or below predetermined values exceeds a predetermined number of times during a predetermined term, the antiskid brake control unit 41 evaluates that the present road condition is OFF-ROAD then sets flag Fakro to 1.

Antiskid brake control unit 41 selects which of the rear wheels 18L and 18R will represent the wheel speed to determine the acceleration and deceleration for the third channel. In this embodiment, the smaller of the two values detected by wheel speed detecting sensors 30 of rear wheels 18L and 18R is selected as representative of the rear wheel speed. Similarly, the acceleration and the deceleration calculated by the representative value of the rear wheel speed is selected as the representative acceleration or deceleration of the rear wheels.

Antiskid brake control unit 41 presumes a road friction coefficient for the first, second and third channels respectively and calculates a suspected-vehicle body speed.

The antiskid brake control unit 41 also calculates each slip ratio corresponding to the first, second and third channels respectively based on the rear wheel speeds and the suspected-vehicle body speed. The slip ratios are calculated by the following formula:

$$\text{SLIP RATIO} = (\text{WHEEL SPEED}/\text{SUSPECTED-VEHICLE BODY SPEED}) \times 100$$

Thus, when a deviation of the wheel speed becomes large compared to the suspected-vehicle body speed, the slip ratio becomes small in an inversely proportional manner.

The preferred process for presuming the road friction coefficient will now be described using the first channel as a representative embodiment.

As shown in FIG. 10, data is input (step 61) and it is determined whether flag Fabs of the antiskid brake control is set to 1 (step 62), i.e., whether the antiskid brake control is carried out whether or not. Flag Fabs is set to 1 when at least one of the lock flags Flok1, Flok2 or Flok3, corresponding to the first, second and third channels, respectively, equals 1. When the brake switch 31 changes from on to off, flag Fabs is reset to 0. Then, if Fabs is not set to 1, road friction coefficient MU1 is set to 3 which indicates the highest friction road (step 63).

If Fabs equals 1 (i.e. if the antiskid brake control starts to operate), the deceleration DW1, which indicates the deceleration of the last cycle time, is evaluated to determine if it is smaller than a predetermined value, for example −20 G (step 64). If DW1 is smaller than the predetermined value, the acceleration AW1 is evaluated to determine if the acceleration of the last cycle time is larger than a predetermined value, for example 10 G (step 65). If AW1 is not larger than the predetermined value, the road friction coefficient MU1 is set to 1 which indicates the lowest road friction (step 66).

If DW1 is not smaller than the predetermined value in step 64, AW1 is evaluated to see if it is larger than a predetermined value, for example, 20 G (step 67). If AW1 is larger than a predetermined value, the road friction coefficient MU1 is set to 3 which indicates the highest friction road (step 68). On the other hand, if AW1 is not larger than a predetermined value, the road friction coefficient MU1 is set to 2 which indicates a middle friction road (step 69).

The procedures for determining the road friction coefficient for the second and third channels are substantially the same as the above described method so a detailed description has been omitted.

A calculation process of a suspected-vehicle body speed is carried out as follows.

Figure 11:
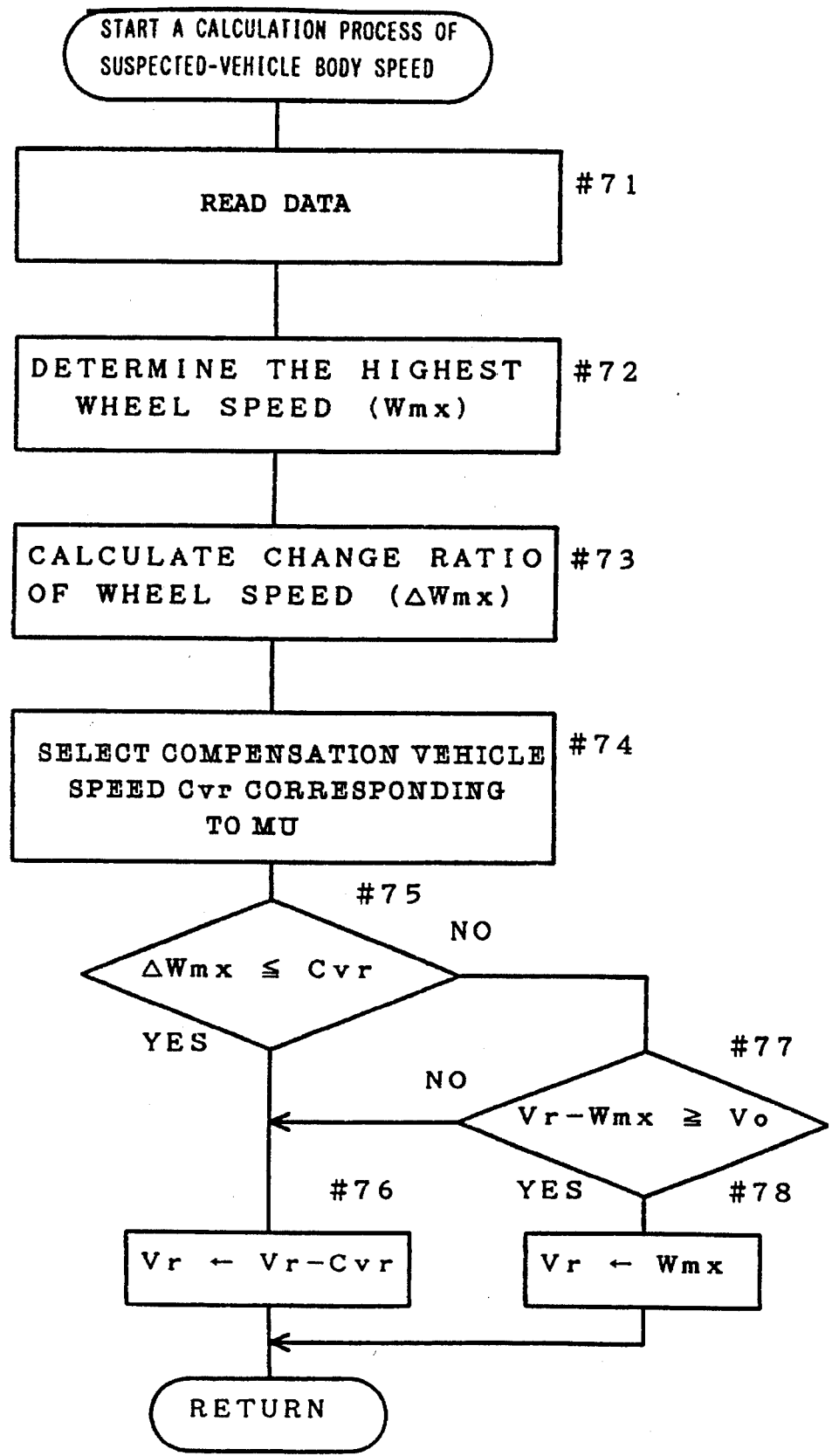
FIG. 11 is a flowchart of an antiskid brake control explaining the calculation of the suspected vehicle body speed.
Figure 12:
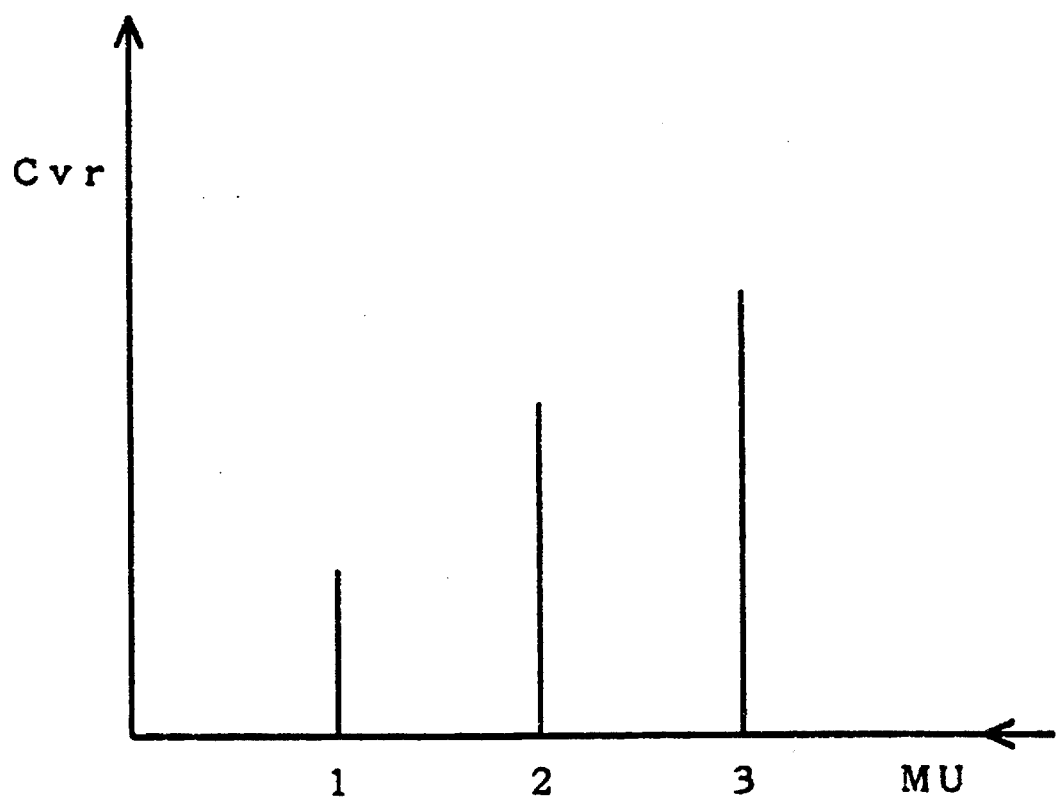
FIG. 12 is a graph which shows a map used at one step of the calculation of the suspected vehicle body speed.

As shown in FIG. 11, data is first input (step 71). The highest wheel speed Wmx of all of the wheels is determined, based on the signals indicating the wheel speeds W1, W2, W3 and W4 (step 72). A rate of change ΔWmx corresponding to a sampling cycle Δt is then calculated (step 73). A compensation vehicle speed Cvr, corresponding to a representative value of road friction coefficient MU, is then obtained (step 74) from a map, as shown in FIG. 12.

Cvr is then compared with ΔWmx to determine whether Cvr is smaller than ΔWmx (step 75). If Cvr is greater than or equal to ΔWmx, Cvr is subtracted from the value of the suspected vehicle body speed Vr at the next preceding time, and Vr is replaced with the new value to yield the suspected vehicle body speed. (step 76). Accordingly, the suspected vehicle body speed Vr is reduced corresponding to the compensation value Cvr based on a predetermined incline.

If Cvr is not greater than ΔWmx in step 75, Wmx is subtracted from Vr, checked to see if it is larger than a predetermined value Vo (step 77). Step 77 thus evaluates whether or not there is a large difference between the wheel speed Wmx and the suspected-vehicle body speed Vr. When there is not a large difference between Wmx and Vr in step 77, the process proceeds to step 76 where Vr is replaced with a value equal to Vr-Cvr, otherwise, the suspected vehicle body speed Vr is replaced with the highest wheel speed Wmx (step 78). The suspected vehicle body speed Vr is renewed at every sampling cycle Δt.

Figure 13:
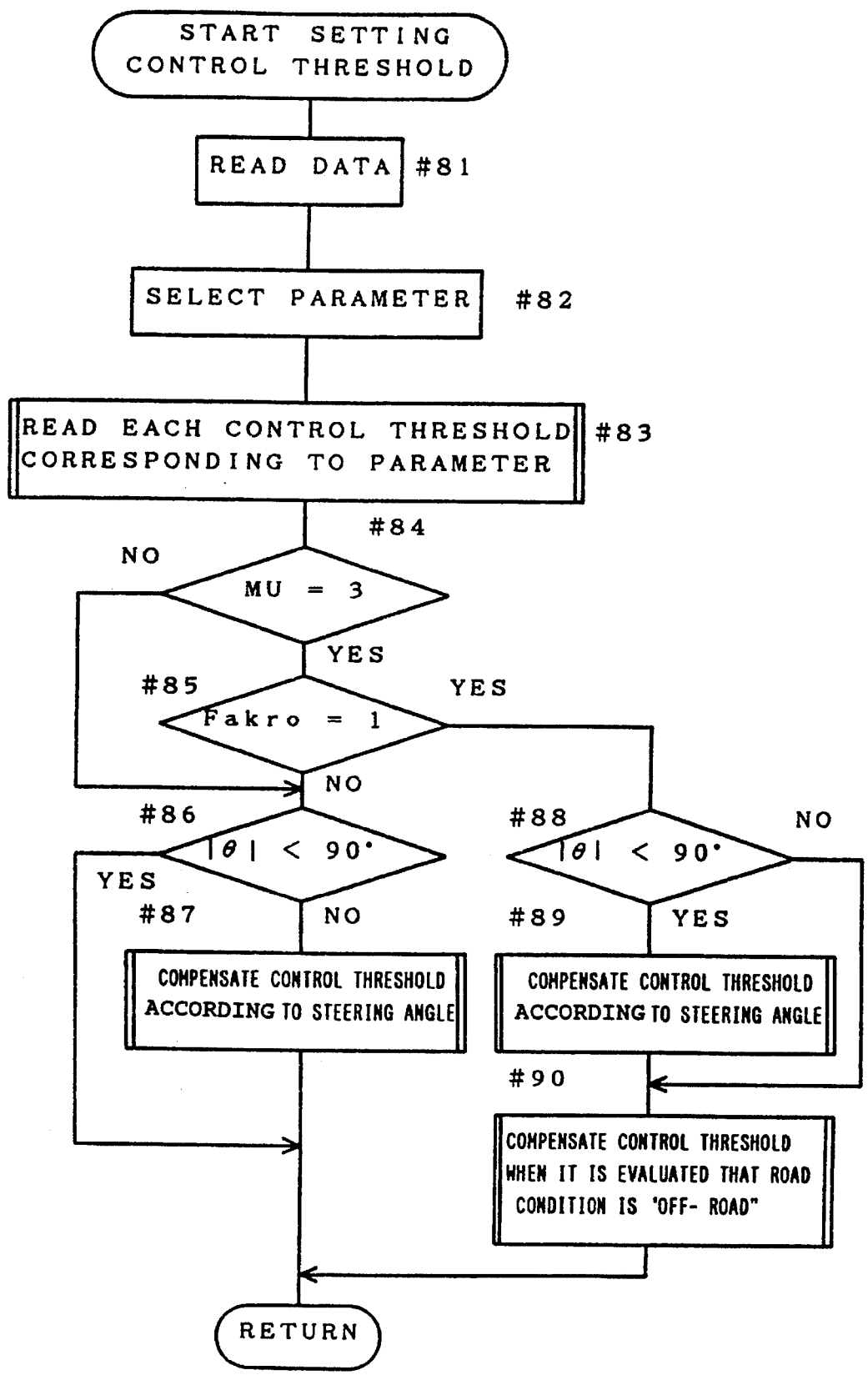
FIG. 13 is a flowchart of an antiskid brake control system which explains how the control threshold is set.

Antiskid brake control unit 41 also sets other control thresholds for the first, second and third channels. As shown in FIG. 13, the preferred process for setting these control thresholds will now be described using the first channel as a representative embodiment.

Data is read into antiskid brake control unit 41 (step 81). Then in step 82, a parameter corresponding to the representative road friction coefficient MU is calculated from wheel speeds W1, W2, W3 and W4 and the suspected vehicle body speed by selecting a value from predetermined parameter selection table, as shown in FIG. 14.

The representative coefficient of friction MU is taken to be the lowest coefficients of friction for the first, second and third channels, MU1, MU2 and MU3. A parameter is then selected which represents the friction coefficient MU and the suspected vehicle body speed Vr. Further, when the Flag Fakro is set to 1, indicating OFF-ROAD, antiskid brake control unit 41 selects a parameter corresponding to the suspected vehicle body speed Vas shown in FIG. 14 (step 82).

When the suspected vehicle body speed V belongs to the middle speed range, HM2 and a high coefficient of road friction is selected as the above parameter. Because the change in wheel speed is often large while driving off road, the road friction coefficient tends to be presumed smaller than it actually is, and therefore a high coefficient of friction is selected.

After the above parameter is selected, the control process of antiskid brake control unit 41 looks up control thresholds from a table, such as the one in FIG. 15 (step 83). The control thresholds corresponding to the suspected vehicle body speed V and the representative road friction coefficient MU are based on this table.

FIG. 15 contains data for a deceleration threshold B'12 of a middle step for evaluating a change between phase 1 and phase 2, a slip ratio threshold B'sg of the middle step for evaluating a change between phase 2 and phase 3, a deceleration threshold B'35 of the middle step for evaluating a change between phase 3 and phase 5 and a slip ratio threshold B'sz for evaluating a change between phase 5 and phase 1. The control thresholds correspond to every level of the table for selecting the parameter.

The above deceleration thresholds have a large effect on the brake force, and achieve a highly efficient brake function when the coefficient of the road friction is large and a high response from the control when the road friction coefficient is small. When the road friction coefficient MU is small, the deceleration is close to 0 G.

When the control unit 41 selects LM2 for a middle speed and a low road friction coefficient as the above parameter, as shown in row LM2 of FIG. 15, the control unit 41 selects −0.5 g, 90%, 0 G, 90% as deceleration threshold B'12, slip ratio threshold B'sg, deceleration threshold B'35 and slip ratio threshold B'sz respectively. MU is then checked to see if it is set to 3 to determine if the road is a high friction road (step 84).

If MU equals 3, a check is made to see if flag Fakro is set to 1 (step 85). If not, the absolute value of the steering angle Θ is evaluated to see if it is less than 90 degrees (step 86). If the steering angle Θ is not less than 90 degrees, the control thresholds are compensated to correspond to the steering angle (step 87) as shown in FIG. 16. When the Θ is large, antiskid brake control unit 41 sets the final slip ratio threshold Bsg, which adds 5 degrees to slip ratio threshold B'sg, and the final slip ratio threshold Bsz, which adds 5 degrees to the slip ratio threshold B'sz, and sets the other threshold values determined in step 83 as the final threshold values.

When the steering angle Θ is smaller than 90 degrees, the thresholds set in step 83 are adopted as the final thresholds.

If flag Fakro is equals 1 in step 85, the absolute value of the steering angle is evaluated to see if it is less than 90 degrees (step 88). If it is, the antiskid brake control unit 41 sets the final slip ratio threshold Bsg by subtracting 5 degrees from the slip ratio threshold B'sg of step 84, and sets the final slip ratio threshold Bsz by subtracting 5 degrees from the slip ratio threshold B'sz determined in step 84 (step 89).

Because the wheel speed detecting sensor 30 is likely to misdetect road friction when the driving off road, antiskid brake control unit 41 sets the final deceleration threshold B12 by subtracting 1.0 G from the deceleration threshold B'12 obtained in step 84 (step 90).

Antiskid brake control unit 41 thus keeps a proper brake force based on a delay of the control response. At the same time, the above thresholds from the step 84 are set as the final thresholds.

When the absolute value of the steering angle Θ is evaluated to be not less than 90 degrees in step 88, the thresholds are compensated according to the off road conditions (step 90).

The control thresholds of the second and third channels are also set in substantially the same fashion.

As shown in FIG. 16, the row of the table representing differential failure discloses that some control mode thresholds reduce the brake force of the wheels when a differential limiting control device (which includes a differential control unit, a differential limiting device and all differentials) fails while the differential is entering the MIDDLE LOCK condition.

Antiskid brake control unit 41 then evaluates the locked condition based on the above final thresholds, a phase decision process for deciding the control amount corresponding to the first, second and third valve units 70, 71 and 73 and a cascade evaluation process. These processes will be described below in detail.

The preferred evaluation process of the lock condition will now be described based on the first channel for the left front wheel as a representative embodiment.

Antiskid brake control unit 41 first sets the present value of continuation flag Fcon1 equal to the latest value of continuation flag Fcon1. Vr is then evaluated to determine whether it satisfies a predetermined condition (for example; Vr<5 Km/hr) and wheel speed W1 is evaluated to determine whether it satisfies another predetermined condition (for example W1<7.5 Km/hr).

The purpose of flag Fcon1 is to evaluate whether the control cycle is the first cycle or a later cycle because, in this embodiment, the contents of the control changes between the first cycle and later cycles. Therefore, the flag is set to 0 for the first cycle and is set to 1 in all later cycles.

When Vr and W1 satisfy the above conditions respectively, the flags Fcon1 and Flok1 are reset to 0. If Vr and W1 do not satisfy the above conditions, Flok1 is evaluated to see if it is equal to 1.

If Flok1 is not set to 1 and Vr and W1 satisfy a predetermined condition (for example Vr is larger than W1), the flag Flok1 is set to 1.

Alternatively, if Flok1 is equal to 1, value P1 of a phase for the first channel is set to 5. When the slip ratio S1 is larger than a predetermined value (for example; 90%), the flag Fcon1 is set to 1. Evaluation processes of the second and third channels are carried out the same way as this first channel.

The preferred phase decision process for deciding the control amount corresponding to the valve units will now be described.

Antiskid brake control unit 41 selects one phase from the following group of phases: Phase 0, indicating a non-operational condition of the antiskid brake device; Phase 1, indicating an increase in brake pressure during the antiskid brake control operation; Phase 2, indicating constant brake pressure after the increase in phase 1; Phase 3 indicating a reduction in brake pressure; Phase 4, indicated a quick reduction in brake pressure; and Phase 5, indicating a constant brake pressure after a reduction of brake pressure. The phase is based on a comparison of control thresholds which were set according to the vehicle driving conditions, deceleration and acceleration of the vehicle and the slip ratio.

Because it is easy to lock the wheels on a low friction or icy roads even if a small amount of brake pressure is applied, the system of the invention has a cascade evaluation process which evaluates whether the wheels are locked so that the wheels are only locked for a short period. When the predetermined conditions indicate that the conditions for a low friction road are satisfied, the cascade flag Fcas is set to 1. Antiskid brake control unit 41 then sets the control amounts corresponding to the above phase values for all three channels and sends signals, for controlling the brake pressure corresponding to these amounts, to the first, second and third valve units 70, 71 and 73 respectively. The brake pressure of the brake pressure lines 69L, 69R, 72L and 72R is adjusted according to these signals.

The preferred antiskid brake control will now be described using the first channel as a representative example.

Figure 17:
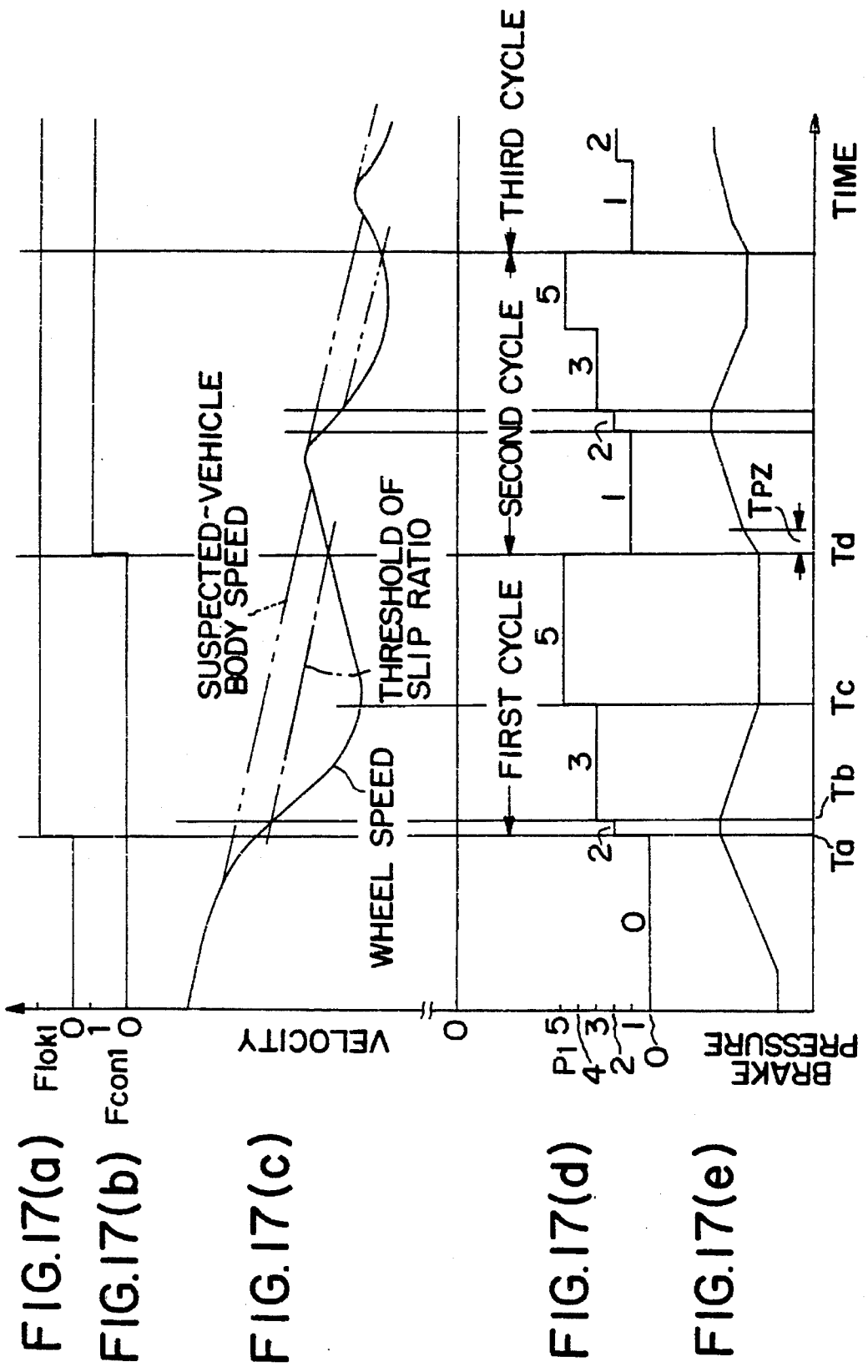
FIGS. 17(a–e) are time-charts showing the function of the antiskid brake control system of one embodiment of the present invention.

As shown in FIG. 17(c), when the vehicle is to be decelerated, and the antiskid brake control is not on, the brake pressure generated in the master cylinder 68 is increased by pushing on the brake pedal 66.

For example, when the wheel deceleration DW1 reaches a predetermined value, for example, −3 G, the flag Flok1 of the first channel is set to 1 (time Ta) and antiskid brake control is carried out.

In the first time cycle of the antiskid brake control, the road friction coefficient is set to a value which indicates high road friction, and the control threshold values are set to correspond to a high friction road. The antiskid brake control unit 41 then compares the slip ratio S1, the deceleration DW1 and the acceleration AW1 with the control thresholds.

When threshold B1, corresponding to the first time slip ratio setting, is 90%, and the slip ratio S1 indicates 96%, antiskid brake control unit 41 changes phase value P1 from 0 to 2, as shown in FIG. 17(d). The brake pressure is thus maintained at the same level both before and immediately after being increased, as shown in FIG. 17(e).

When the slip ratio S1 falls below 90%, phase value P1 is changed from 2 to 3 and the brake pressure is reduced, front wheel 16L is changed from a locked condition to rotational condition. The brake pressure then continues to be reduced and deceleration DW1 and acceleration AW1 are compared with the their respective threshold values. When deceleration DW1 becomes lower than the deceleration threshold B35, phase value P1 changes from 3 to 5 and the brake pressure is maintained at a constant level.

When the phase value is 5, and when the slip ratio S1 is larger than the slip ratio threshold Bsz, flag Fcon1 is set to 1 as shown in FIG. 17(b). Antiskid brake control of the first channel is then shifted to a second cycle (time Td). When this happens, antiskid brake control unit 41 automatically sets phase value P1 to 1.

Immediately after P1 is set to 1, the opening and closing valve of the first valve unit 70 is controlled based on a duty ratio of 100%, corresponding to a quick brake pressure increasing time Tpz set by a holding time of the phase 5 in the first cycle. The brake pressure is thus quickly increased, as shown in FIG. 17(e). After time Tpz, the operation of the opening and closing valve is controlled by a predetermined duty ratio so that the brake pressure is more gradually increased.

After this second cycle, the proper coefficient of the friction MU1 is determined according to deceleration DW1 and acceleration AW1 of the last time cycle, and the corresponding control thresholds are selected from the table of predetermined control thresholds. Thus, accurate control of the brake pressure, corresponding to actual driving conditions, can be carried out.

When P1 equals 5, and slip ratio S1 is larger than the slip ratio threshold Bsz, phase value P1 is set to 1 and the antiskid brake device enters the third cycle.

In this embodiment, when either a differential limiting control device or an antiskid brake control unit (including the antiskid brake control unit and antiskid brake device), fails, a signal indicating the failure in one device is input to the other device and the other device controls the vehicle according to the failure of that device.

Differential control unit 43 receives signals from antiskid brake control unit 41 which indicates whether or not the antiskid brake control unit is currently operating, the content of the condition, whether or not the antiskid brake control unit has failed, and the content of the failure, including signals of the wheel speeds.

Antiskid brake control unit 41 receives signals from differential control unit 43 which indicates the condition of the front, center and rear differentials, whether or not the differential limiting control device has failed and the content of the failure.

Failure of the antiskid brake control unit means that the antiskid brakes are not operational. Any part of the antiskid brake control unit may fail, including antiskid brake control unit 41, the hydraulic control mechanism which includes the valves and pump, etc, and measuring equipment including the wheel speed detecting sensors and the brake devices 61L, 61R, 62L and 62R.

When the differential limiting control device fails, the differential controls are not operational. Any part of the differential limiting control device may fail, including differential control unit 43, the differential limiting mechanism, which includes the electro-magnetic clutch 50 and differentials 21, 20 and 22.

Figure 18:
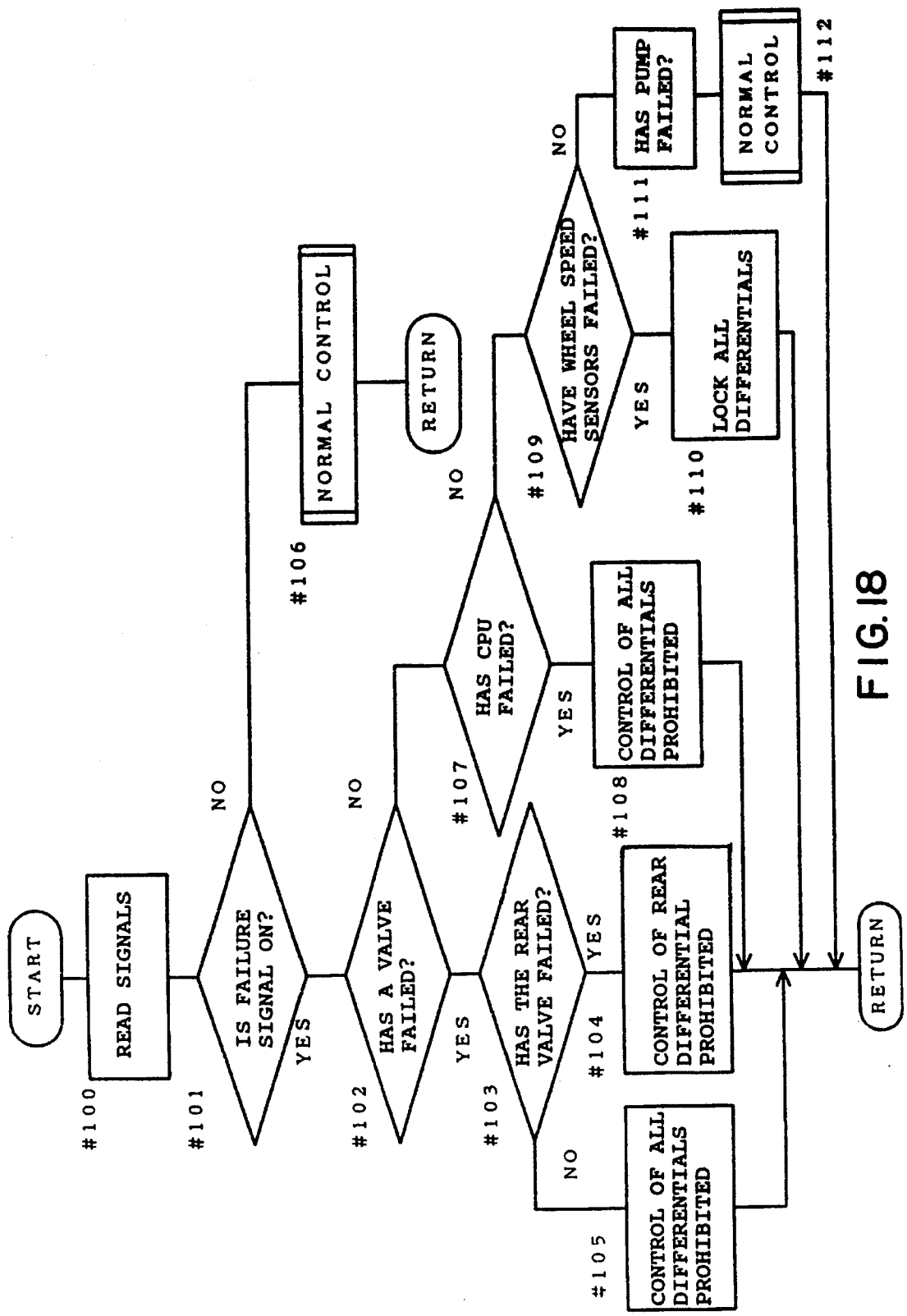
FIG. 18 is a flowchart of the differential limiting device explaining the control of the differential limiting device when the antiskid brake device fails.

The preferred control of differential control unit 43, when the antiskid brake control unit fails, will first be described with reference to FIG. 18.

After the control starts, data signals comprising the operation signal of the antiskid brake control unit, the signal indicating the failure, and the signal indicating the contents of the failure are sent from antiskid brake control unit 41 to differential control unit 43 are read (step 100).

The failure signal of the antiskid brake control unit is evaluated to determine whether the antiskid brake control unit was on (step 101). If it was, the differential limiting control proceeds in a normal condition (step 106).

If the antiskid brake control unit was not on, the failure is evaluated to determine whether or not the failure is related to valve units 70, 71 and 73 (step 102). Valve units 70, 71 and 73 are evaluated, for example, when the vehicle is turned on.

If there is a valve failure, the third valve unit 73, controlling rear wheels 18L and 18R, is evaluated (step 103). If the third valve unit has failed, the differential limiting control of rear differential 22 is prohibited because antiskid brake control can not be carried out (step 104). If the third valve unit 73 has not failed, control corresponding to all differentials 20, 21 and 22 is prohibited (step 105).

If the reason for the failure in step 102 is not related to valve units 70, 71 and 73, the signals are evaluated to determine whether the failure is related to a computer CPU of antiskid brake control unit 41 (step 107). If it is, the control corresponding to all differentials 21, 20 and 22 is prohibited (step 108).

If the CPU has not failed, the signals are evaluated to determine if the failure is related to the wheel speed detecting sensors 30 (step 109). The values of the wheel speed detecting sensors 30 are mutually compared at a predetermined constant driving condition. If the results are disparate, the failure is evaluated to be related to the wheel speed detecting sensors 30. When this happens, all differentials 21, 20 and 22 are locked. (step 110).

The actual wheel speed can be calculated by locking all differentials because, as the wheel speed output from all the sensors 30 becomes approximately the same value, the actual wheel speed can be calculated by a functional wheel speed detecting sensor 30, and thus the proper brake force can still be calculated.

If the wheel speed sensors 30 have not failed, the pump is evaluated to determine if the failure is related to it (step 111) and the normal differential limiting control is carried out (step 112).

As described above, in this embodiment, when the antiskid brake control unit fails, the failure signal is input to differential control unit 43 so that it can properly control according to the contents of the failure of the antiskid brake control device.

When the reason of the failure is related to the wheel speed detecting sensors 30, the differential limits for differentials 20, 21 and 22 are increased so that they all lock and cause the wheel speeds to be approximately the same. The actual wheel speed can then be calculated by any remaining functional wheel speed sensor 30.

When the reason of the failure is related to the CPU of the antiskid brake control unit 41 or to the valve units of the hydraulic control mechanism, the differential control unit 43 prohibits differentials 21, 20 and 22 from locking. In this condition, wheels 16L, 16R, 18L and 18R can be prevented from locking at the same time and the stability and control of the vehicle can be maintained.

When only the rear valve 73 fails, only the rear differential is prohibited from locking so that the rear wheels 18L and 18R are prevented from locking at the same time.

For driving stability, when all differentials 21, 20 and 22 are locked during the braking operation, it is not desirable for the rear wheels to lock prior to the front wheels. Accordingly, when the braking operation is carried out and the antiskid brake control device fails, differential control unit 43 prohibits power to differentials 20, 21 and 22. However, when differentials 20, 21 and 22 are in the locked condition, the center differential 20 is first released, then the rear differential is released and then the front differential is released.

Figure 19:
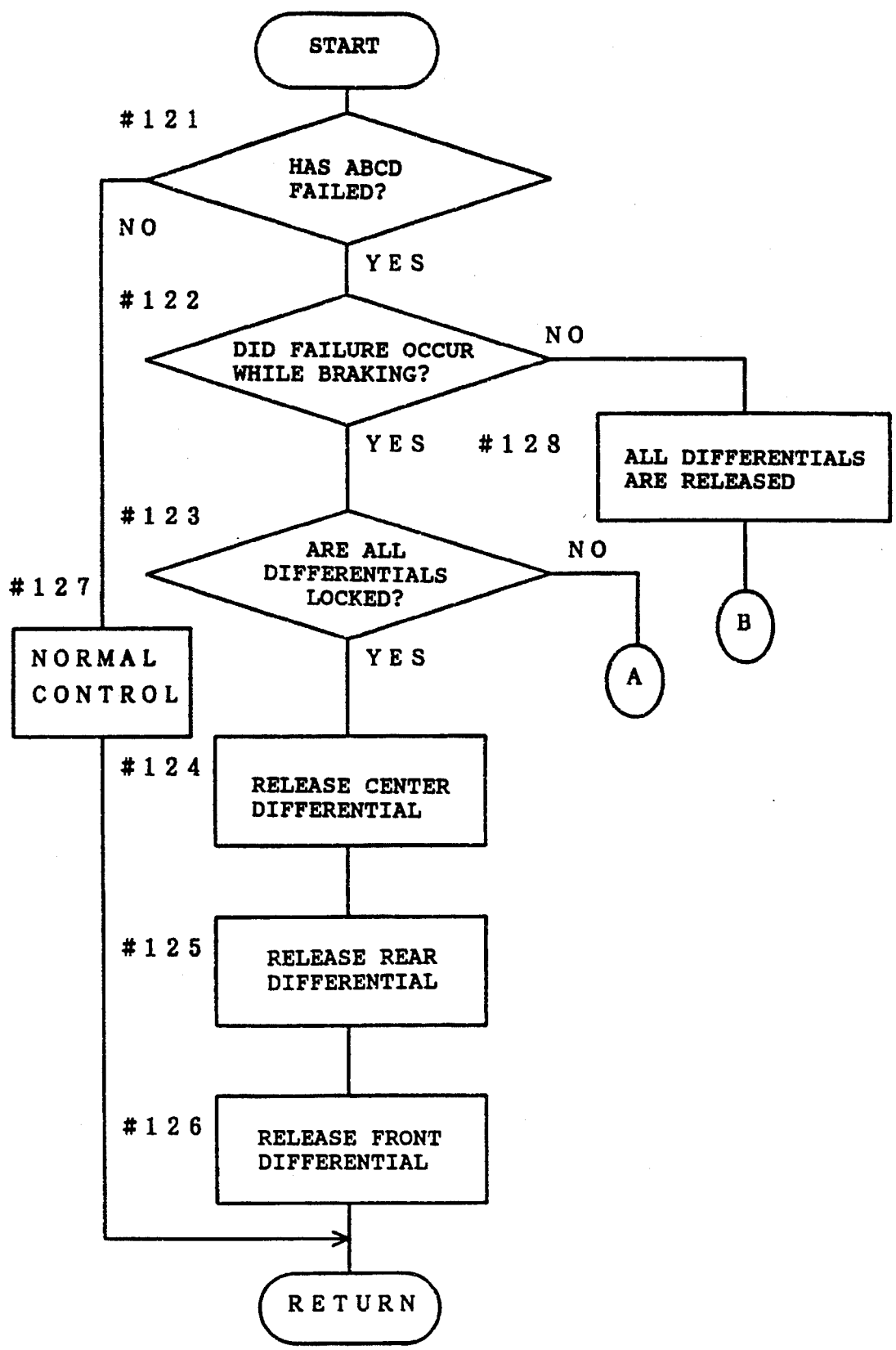
FIGS. 19 and 20 are flowcharts of a differential limiting device for releasing power from the differential when the antiskid brake device fails.
Figure 20:
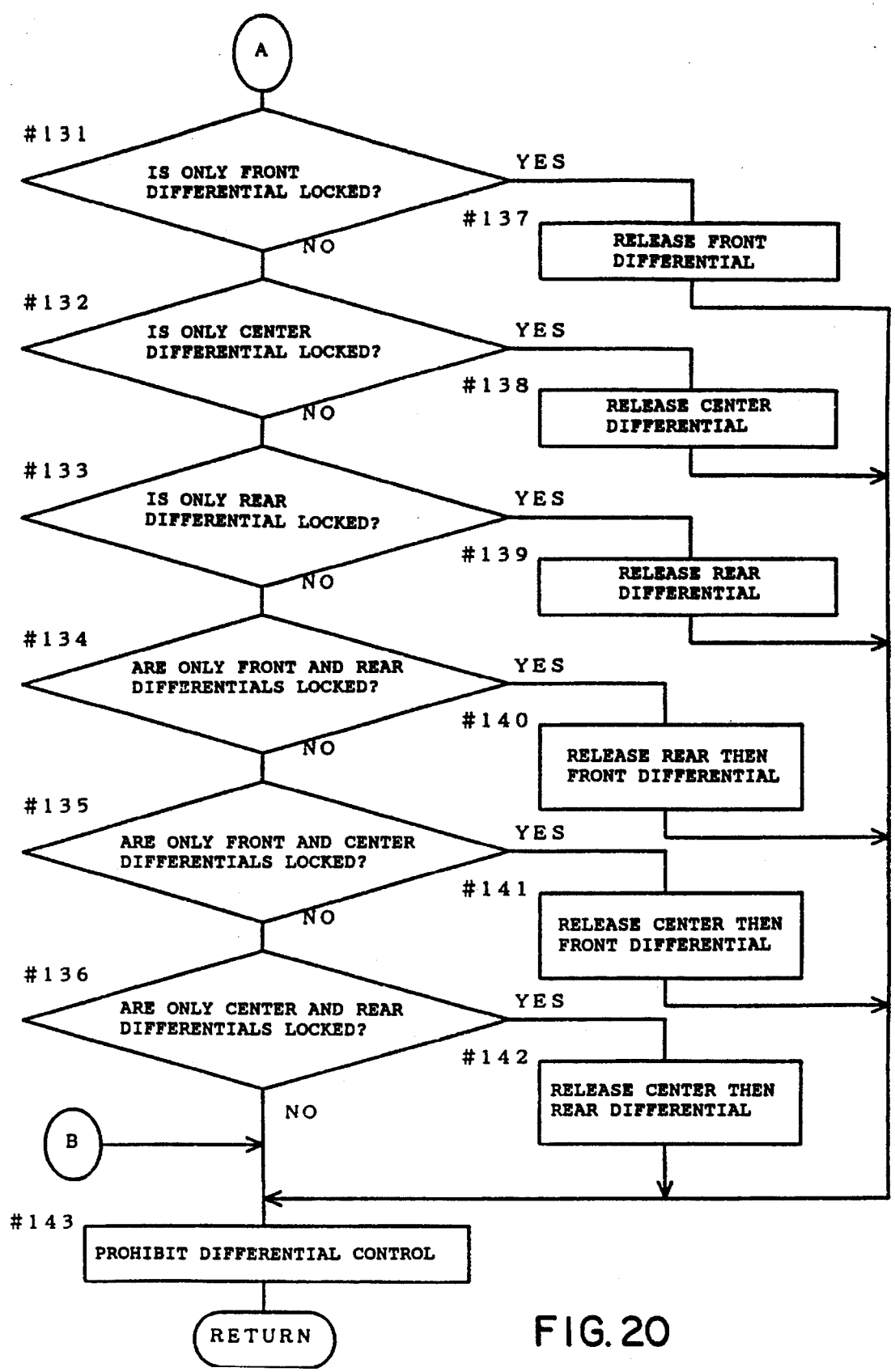

The preferred control for releasing differentials 21, 20 and 22 from the lock condition will now be described with reference to FIGS. 19 and 20.

First, the antiskid brake control device is evaluated to determine whether or not it has failed (step 121). If it hasn't, control continues as usual (step 127). If there is a failure, however, it is determined whether or not the failure occurred during a braking operation (step 122).

If the failure did not occur during a braking operation, all differentials 20, 21 and 22 are released from the lock condition immediately (step 128) and control corresponding to the differentials is prohibited (step 143). If the failure did occur during a braking operation, differentials 20, 21 and 22 are evaluated to determine whether or not they were in all in the locked condition (step 123). If they were, the center differential is first released (step 124), the rear differential is then released (step 125) and then the front differential is released (step 126).

If all differentials 21, 20 and 22 are not locked, the order in which the differentials are released will change. If only one differential is locked (steps 131–133), that differential is released (steps 137–139) and thereafter differential control is prohibited (step 143).

When both the front and rear differentials are locked (step 134), the rear differential is released first and then the front differential is released (step 140). When both the front and center differentials are locked (step 135), the center differential is released first and then the front differential is released (step 141). When both the center and rear differentials are locked (step 136), first the center differential is released and then the rear differential is released (step 142). Once all the differentials are released, differential control of all differentials is prohibited (step 143).

In this fashion, the rear wheels may be prevented from locking prior to the front wheels and the stability of the vehicle is insured.

When the device for carrying out the antiskid brake control fails while the vehicle is operating, there are some situations where it will be desirable to cause all differentials to be locked, instead of unlocked, in order to achieve a high brake force. This control will now be described with reference to FIGS. 21 and 22.

First flag F is evaluated to determine if it is equal to 5 (step 150). As described below, when the antiskid brake control device fails during a braking operation, flag F is set to 5 after differentials 20, 21 and 22 become locked and then the vehicle is stopped or when the brake is released and differentials 20, 21 and 22 are released from the locked condition. When flag F is equal to 5 in step 150, differential control is prohibited (step 159).

If flag F is not equal to 5, flag F is evaluated to determine whether it equals 1 (step 151). Flag F equals 1 when all differentials are in the lock condition. If flag F does not equal 1, the antiskid brake control device is evaluated to determine whether or not it generated the failure signal (step 152). If it did not, normal control is resumed (step 160). If the antiskid brake control device did generate the failure signal, the failure is evaluated to determine whether or not it occurred during a braking operation (step 153).

If the failure did not occur during a braking operation, all differentials 20, 21 and 22 are released from the locked condition, (step 157) and flag F is set to 5 (step 158). If the failure did occur during the braking operation, the differentials are evaluated to determine whether they all are in the locked condition. If they are, flag F is set to 1.

If all differentials are not in the locked condition in step 154, the signals are evaluated to determine which differentials are locked because, the order in which they are to be locked depends on which differentials are initially locked.

When only the front differential is locked (step 161), first the center and then the rear differentials are locked (step 168). If only the center differential is locked (step 162), then first the front differential is locked and then the rear differential is locked (step 169). When only the rear differential is locked (step 163), first the center differential is locked and then the front differential is locked (step 170). After all differentials are locked, flag F is set to 1 (step 174).

When two of the differentials are initially locked (steps 164–166), then the remaining differential is locked (steps 171–173). When no differential is locked, first the center differential is locked, then the front differential is locked and then the rear differential is locked. After all differentials are locked, flag F is set to 1 (step 174).

When the flag F=1 in step 151, and the vehicle is stopped or the brake operation is released then all differentials are released from the locked condition (step 157) and flag F is set to 5.

When the antiskid brake control device fails during the braking operation, the reason for locking the front differential 21 prior to locking the rear differential 22 is that in general the braking force contributed by the front wheels is greater than the braking force contributed by the rear wheels.

After a failure signal from the antiskid brake control device is generated during the braking operation, differentials 20, 21 and 22 become locked and maintained in the locked position. However, when the braking operation is carried out repeatedly, differentials 20, 21 and 22 may all be locked permanently.

Figure 22:
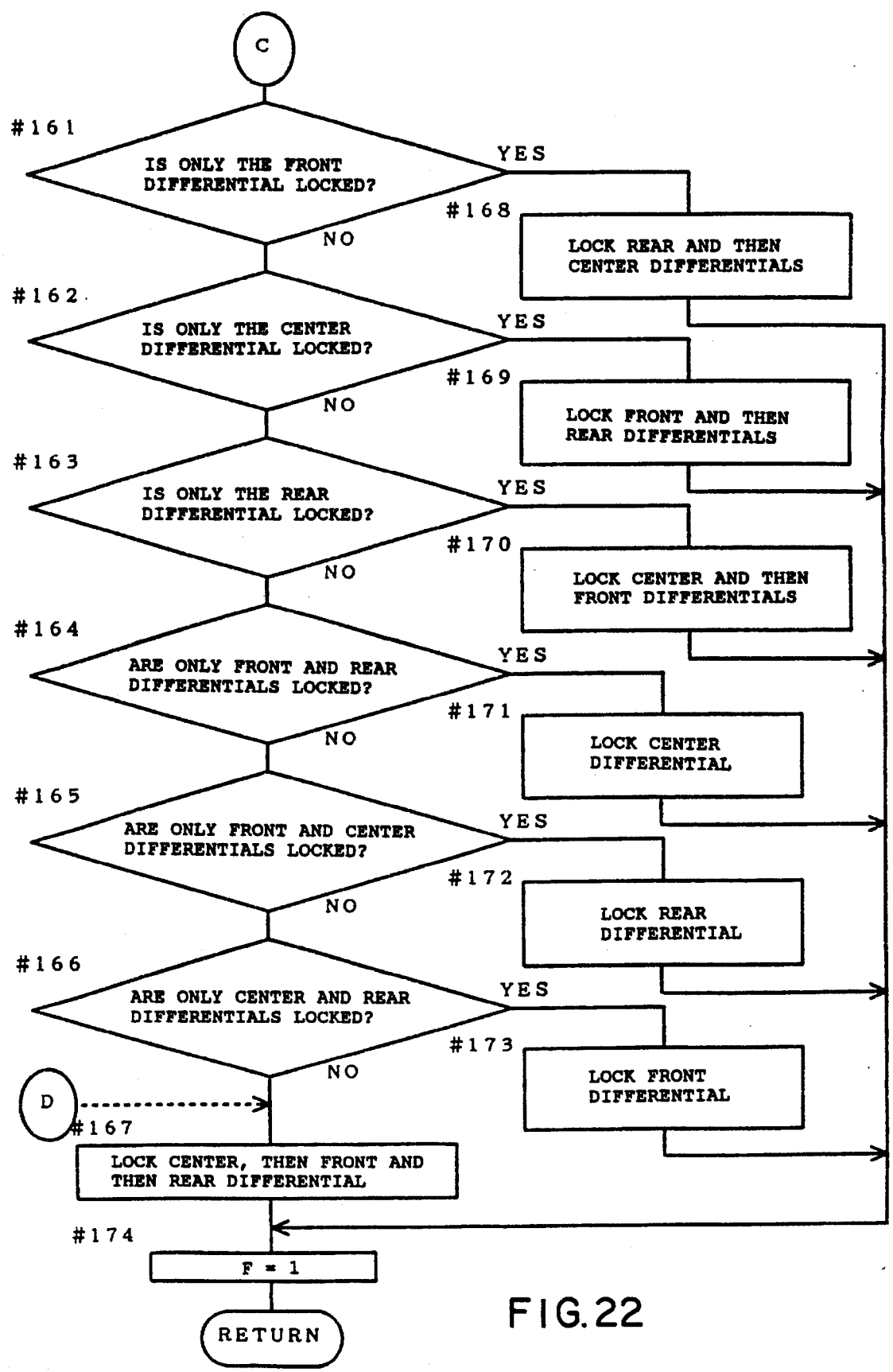
Figure 23:
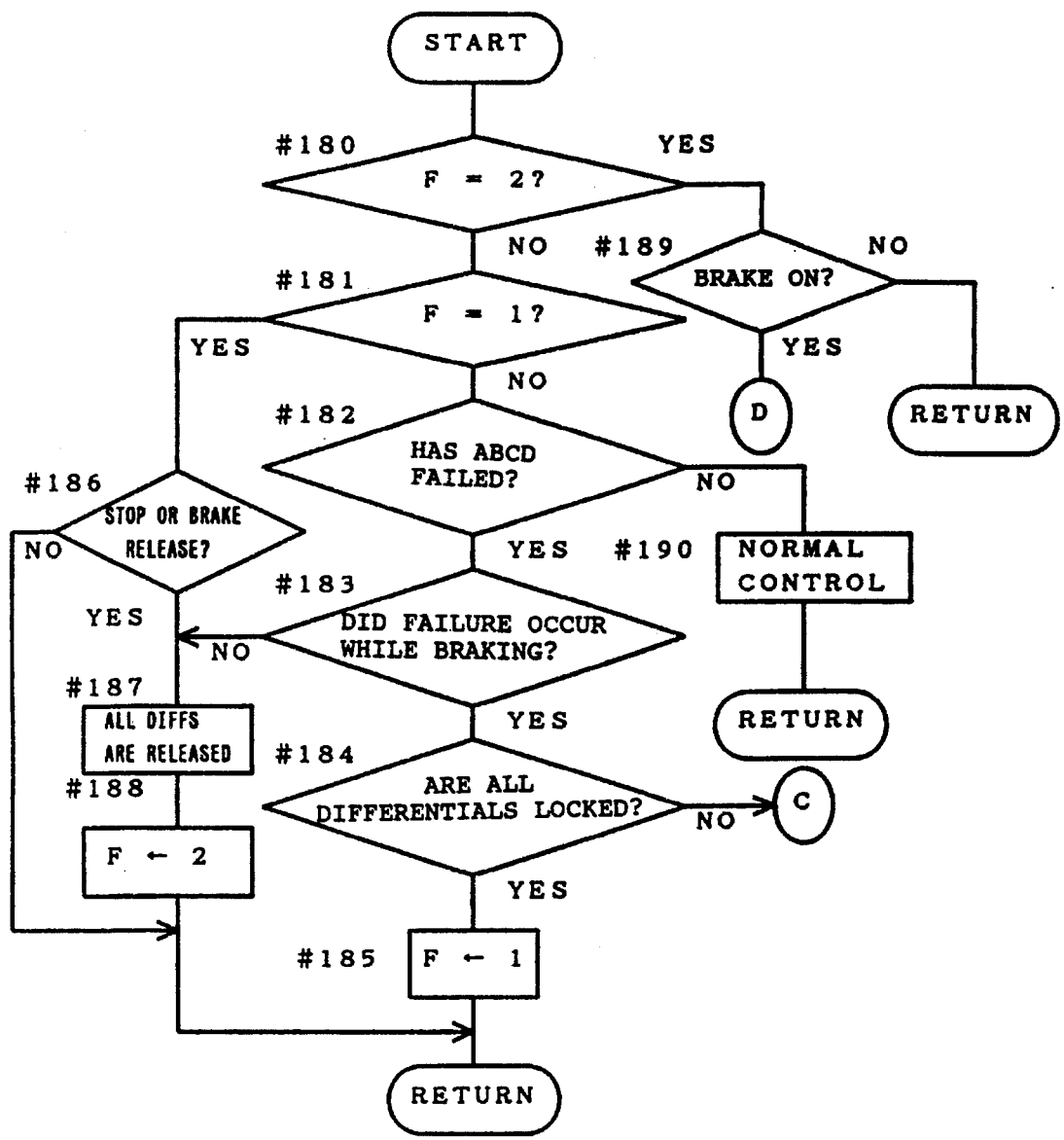

As shown in FIG. 23, flag F is first evaluated to determine whether it is set to 2. Flag F is set to 2 when all differentials become locked immediately after the brake operation is carried out during which all differentials were released. If flag F equals 2, the brake is checked to see if it is on (step 189), and if it is, all differentials are locked (see FIG. 22).

Figure 21:
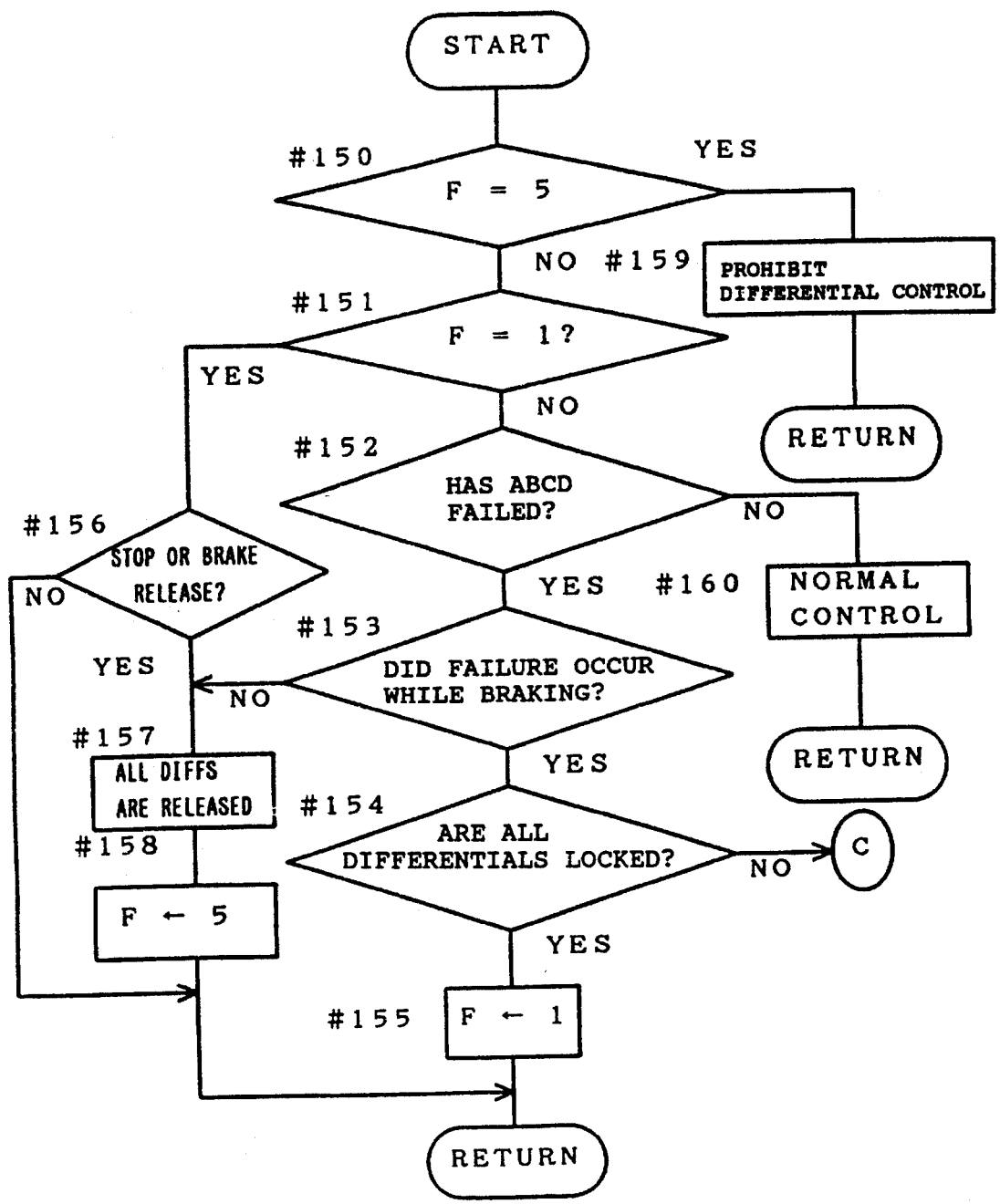
FIGS. 21, 22 and 23 are flowcharts of a differential limiting device for increasing power from the differential when the antiskid brake device fails.

The content of the flowchart in FIG. 23 is the same as the flow chart in FIG. 21 with steps 181–187 corresponding to steps 151–157. The only difference is in step 188 where flag F is set to 2, whereas in step 158 of FIG. 21, flag F is set to 1.

When the antiskid brake control device generates a failure signal, and the signals indicating the failure are input to differential control unit 43 during the brake operation, differential control unit 43 adopts either the control for locking differentials 20, 21 and 22 or the control for prohibiting differentials 20, 21 and 22 from locking depending on the driving conditions of the vehicle, e.g. vehicle body speed.

For example, when the vehicle body speed is higher than a predetermined value, the differentials are prohibited from locking to provide stability. However, if the vehicle body speed is equal to or lower than the predetermined value, the control which causes the differentials to lock is executed so that the vehicle can stop in as short a distance as possible.

Alternatively, instead of determining which control will be used by the vehicle body speed, the control can adopt to the road friction coefficient. When the road friction coefficient is relatively low, the control may prohibit the differentials from locking to enhance stability. When the road friction coefficient is relatively high, the control may cause the differentials to be locked so that the vehicle will stop in as short a distance as possible.

Figure 24:
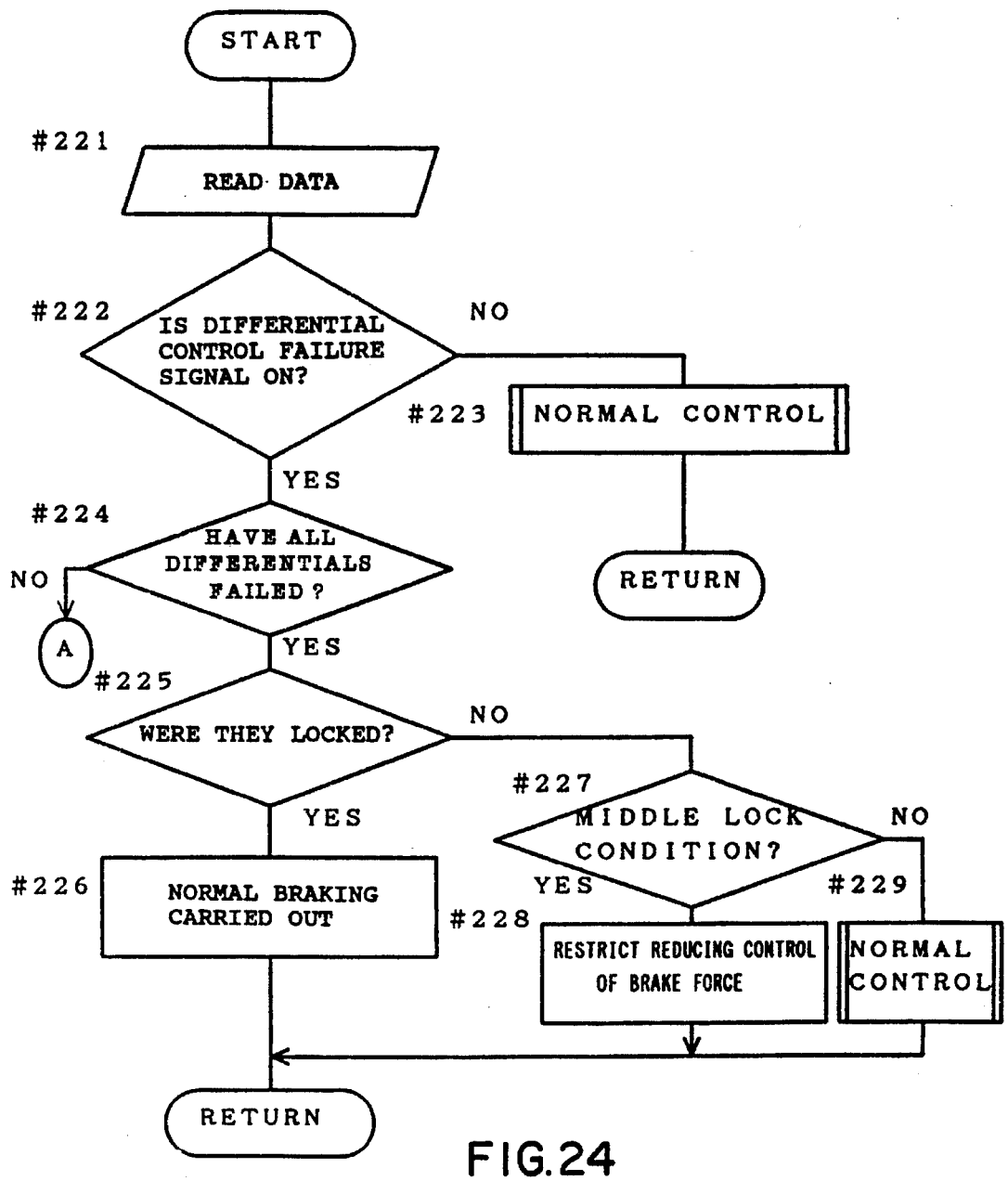
FIGS. 24, 25 and 26 are flowcharts explaining the control of the antiskid brake device when the differential limiting device fails.
Figure 25:
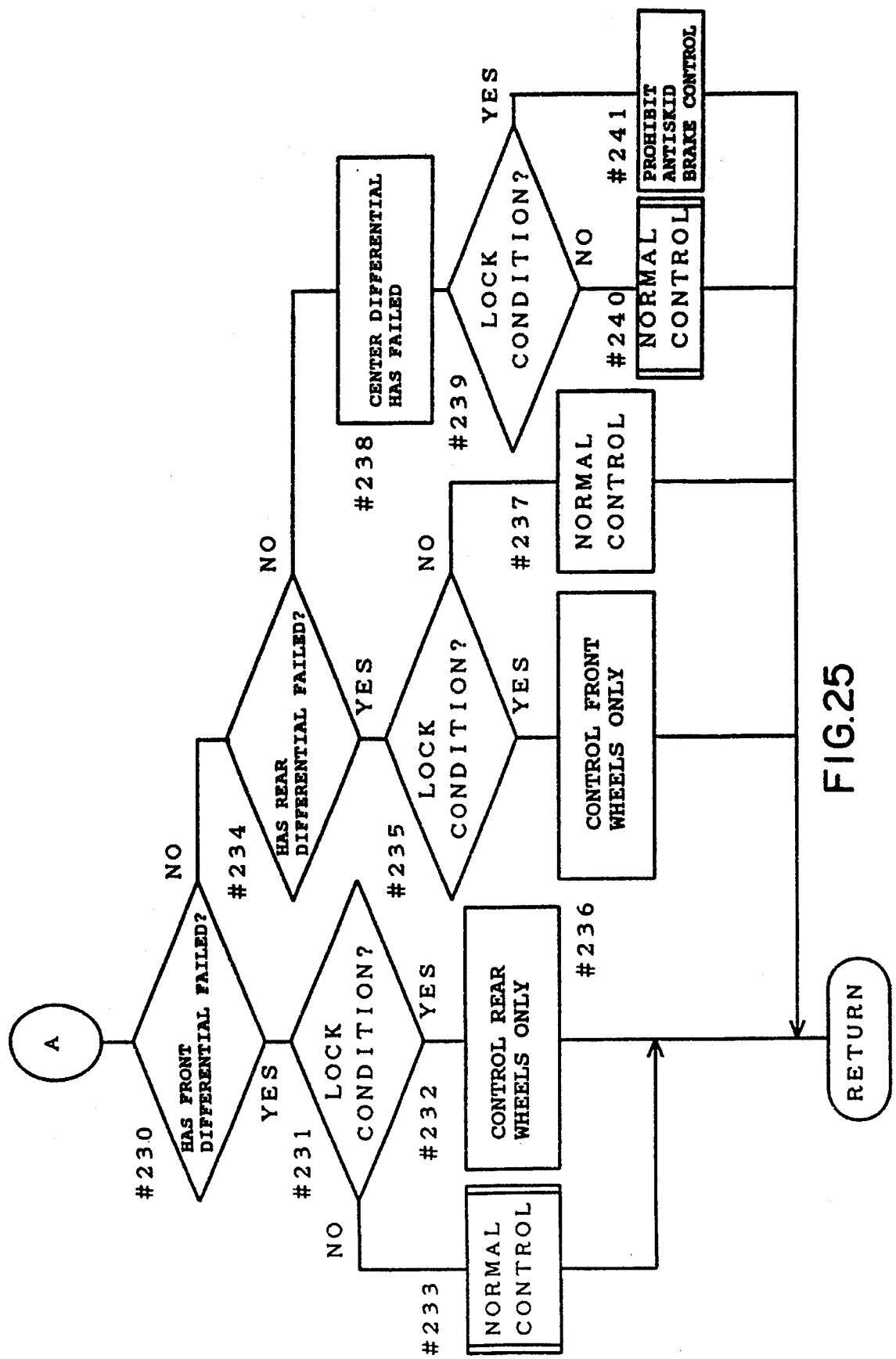

The preferred control of the antiskid brake control unit during differential limiting control device failure will now be described referring to FIGS. 24 and 25.

Data is first input to antiskid brake control unit 41 from differential control unit 43. This data includes differential operation signals from differentials 20, 21 and 22, a failure signal indicating a failure of the differential limiting device and a signal indicating the content of the failure.

Evaluation of the failure signal from the differential limiting device continues whether or not the ignition switch is on. If the current is not sent by the differential limiting device, it is evaluated as having failed. Even if the current is sent by the differential limiting device, the differential limiting device may still be evaluated as having failed if the wheel speed calculated between the wheels and the axles deviates more than a predetermined amount, as adjusted by the steering angle.

Specifically, if the deviation is not within a predetermined scope, which is defined by a relationship between the vehicle speed and the steering angle, the differential limiting device is evaluated as having failed. The extent of the predetermined scope will differ depending if the differential is in the middle lock position or the locked position. For example, the upper and lower thresholds which define the middle lock condition are higher than the upper and lower thresholds which define the locked condition.

After the data is input, the failure signal is evaluated to determine if the differential limit control is on (step 222). If the differential limit control is not on, control continues as usual (step 223).

If the differential limit control is on, the differentials are evaluated to determine whether or not all differentials have failed (step 224). If they have, they are evaluated to determine whether they failed in the locked position (step 225). If all differentials are locked, normal braking is carried out as usual by pressing on the brake pedal (step 226). In this case, the antiskid brake control is prohibited from preventing the brake pressure of the unnecessary wheels to reduce the brake pressure, all differentials are prevented from becoming locked at the same time and the torque between the driving wheels is prevented from becoming excessive. Torque here means the torque in a shaft between the driving wheels produced by a difference between the right and left wheels or between the front and rear wheels while the vehicle turns at a corner in the road or while the vehicle travels down a curved road.

Similar to the other described control systems, it may be desirable for the antiskid brake control system to only control the rear wheels 18L and 18R so that the directional stability of the vehicle may be enhanced, instead of optimizing braking ability.

When the differentials are evaluated to not all be in the locked position in step 225, then the failure signal is evaluated to determine whether or not all differentials were in the middle lock condition (step 227). If they were not, normal control is carried out (step 229). If they were, the antiskid brake control restricts the brake force applied to the wheels (step 228).

The antiskid brake control then determines whether or not to delay a reduction in brake pressure or to hasten an increase in brake pressure. In this manner, the antiskid brake control compensates the control thresholds toward a tendency of the lock condition. The control adopts values from the table in FIG. 16. It is thus not easy to shift from the increase step (phase 1) to the maintaining step (phase 2) or from the maintaining step to the reduction step (phase 3), and it is easy to shift from the reducing step to the maintaining step after the reducing step (phase 5) and from the maintaining step (phase 5) to the increase step.

In a preferred control, it is desirable for the slip ratio threshold B1, for starting the antiskid brake control, to become smaller than the usual value. For example, the slip ratio of −3 G at normal condition is changed to another value, such as −5 G, which renders it more difficult to start antiskid brake control.

A further preferred control, combines both the first and second embodiments.

The above embodiments are restricted to carrying out the antiskid brake control for reducing the brake force of the wheels, while the function of the antiskid brake control can be retained as much as possible and the brake force on the wheels can be maintained.

On the other hand, when all differentials are not in the middle lock position in step 227, all differentials are in the unlocked position and control is carried out normally. Compensation of the suspected vehicle body speed is prohibited by an acceleration detecting sensor (not shown).

When all differentials do not fail in step 224, the front differential is evaluated to determine if it has failed (step 230). If the front differential has failed, then the front differential is evaluated to determine whether or not it was in the locked condition (step 231). If it was locked, antiskid brake control is carried out only on the rear wheels 18L and 18R (step 232). However, if the front differential was not locked when it failed antiskid brake control is carried out normally (step 233).

If the front differential has not failed, the rear differential is evaluated to determine if it has failed (step 234). If it has failed, then the rear differential is evaluated to determine whether or not it was in the locked condition (step 235). If it was locked, antiskid brake control is carried out only on the front wheels 16L and 16R (step 2236). However, if the rear differential was not locked when it failed antiskid brake control is carried out normally (step 237).

If neither the front nor the rear differential have failed, then the signals are evaluated to determine whether or not the center differential has failed (step 238). If it has failed, the center differential is evaluated to determine whether or not it was locked when it failed (step 239). If it was locked, antiskid brake control is prohibited (step 241). If it was not locked when it failed, antiskid brake control is carried out normally (step 240).

Thus, even if center differential 20 can be not controlled, the antiskid brake control may be permitted in both the front and rear differentials, and may still be useful.

Figure 26:
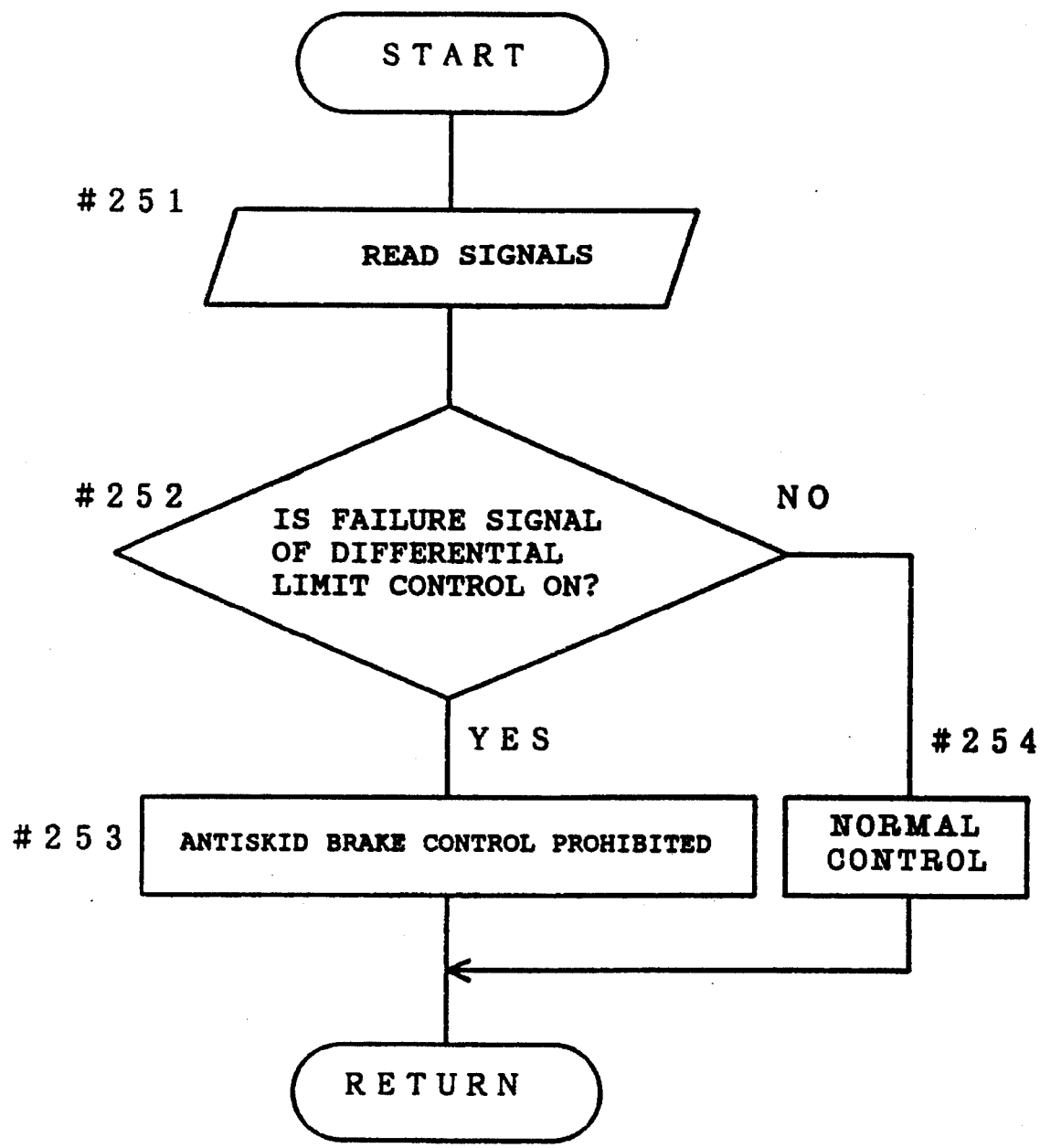

When a differential limiting control device fails, it may be desirable for antiskid brake control unit 41 to be prohibited from using the other preferred control embodiment. When this happens, as shown in FIG. 26, data is first input from differential control unit 43 to antiskid brake control unit 41. This data includes operational signals from the differential limiting devices corresponding to differentials 20, 21 and 22 respectively, a failure signal and a signal for indicating the content of the failure (step 251).

The failure signal is then evaluated to determine whether or not the differential limiting control device was on. If the differential limiting control device was not on, control is carried out as usual, however, if the differential limiting control device was on, then antiskid brake control is immediately prohibited.

When a failure occurs in the differential limiting device 43, the failure signal is input to the antiskid brake control so that the antiskid brake control is able to execute proper control. Especially when the content of the failure signal indicates that all differentials were in the middle lock position when the failure occurred, the antiskid brake control unit 41 is able to restrict control to reduce the brake force applied to the wheels. Thus, the antiskid brake control functions to retain as much force on the wheels as possible.

In this embodiment, antiskid brake control unit 41 either compensates the control threshold for delaying the reduction of the brake pressure or hastening the increase of the brake pressure or reduces the slip ratio threshold B1 so that it is more difficult to start antiskid brake control, i.e. the normal slip ratio of −3 G is changed to another lower value. Thus, in this embodiment, the antiskid brake control is restricted from reducing the braking force on the wheels.

When the content of the failure signal from differential control unit 43 indicate that all differentials are in the locked position, antiskid brake control unit 41 is prohibited from operating because to operate them would be useless. Accordingly, the antiskid brake control device is prevented from receiving an excessive load or from generating excessive torque between the driving wheels.

Thus, in the invention, when either the differential limiting control device or the antiskid brake control device fails, a failure signal is sent to the other device so that device may control the vehicle.

Although description has been made with reference to a four wheel drive vehicle having front, center and rear differentials, the same control system may be adopted to a two wheel drive vehicle. Further, the antiskid brake control device and the differential control device can be included in a single control unit.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A control device for an automotive vehicle comprising:
an antiskid brake control device for controlling an antiskid brake device; and a differential control device for controlling a differential limiting device;

wherein upon a failure of one component operatively associated with one of said antiskid brake control device or said differential control device, the other control device receives a signal indicating a failure from said antiskid brake control device or said differential control device, and then the other control device assumes control of the control device experiencing a failure in said one component, and wherein following receipt of the signal indicating a failure, the differential control device increases a differential limit from an amount previously set.

2. A control device according to claim 1, further comprising:

a differential device for absorbing a difference in rotational speed between wheels of the vehicle, said differential limiting device controlling operation of said differential device based on a differential limit.

3. A control device according to claim 1, wherein following receipt of the signal indicating a failure, the differential control device controls said differential limiting device so as to prohibit power from being transmitted to said differential device.

4. A control device according to claim 3, further comprising a plurality of differential devices, and wherein said differential control device controls said differential limiting device so as to release one differential device from a locked condition before it releases another differential device from a locked condition.

5. A control device according to claim 1, wherein following receipt of the signal indicating failure, the differential control device controls the vehicle by at least one of increasing a differential limit of the differential limiting device and by prohibiting power from being transmitted to a differential device.

6. A control device according to claim 1, wherein after the antiskid brake control device receives a signal from the differential control device indicating failure, the antiskid brake control device increases a brake force.

7. A control device according to claim 6, wherein the antiskid brake control device comprises a threshold control device for changing a threshold of the antiskid brake control device, said threshold control device shifts the threshold from a starting value to a second threshold value when the antiskid brake control device receives the signal indicating failure from said differential control device.

8. A control device according to claim 6, wherein said antiskid brake control device comprises a threshold control device for changing a threshold of the antiskid brake control device, said threshold control device shifts the threshold from a starting value to a second value upon receipt of the signal indicating failure so as to change a starting condition of said antiskid brake control.

9. A control device according to claim 1, wherein following receipt of the signal indicating failure from said differential control device, said antiskid brake control device prohibits antiskid brake control.

10. A control device according to claim 1, wherein said antiskid brake control device and said differential control device are included in a common control unit.

11. A control device according to claim 1, wherein said one component operatively associated with said antiskid brake control device includes at least one of said antiskid brake control device, a brake valve, a brake line, a brake pump, a wheel speed sensor and a brake device.

12. A control device according to claim 1, wherein said one component operatively associated with said differential control device includes at least one of said differential limiting device and a differential.

13. A method of controlling a vehicle comprising:

controlling an antiskid brake device by using an antiskid brake control device; and controlling a differential limiting device by using a differential control device;

issuing a signal indicating failure of one component operatively associated with one of the antiskid brake control device or the differential control device such that the other control device receives a signal indicating the failure from the antiskid brake control device or the differential control device;

controlling the control device experiencing a failure in the one component by using the other control device;

controlling operation of a differential device based on a differential limiting device; and increasing a differential limit from an amount previously set following receipt of the signal indicating a failure.

14. A method of controlling according to claim 13, further comprising:

controlling the differential limiting device so as to prohibit power from being transmitted to the differential device following receipt of the signal indicating a failure.

15. A method of controlling according to claim 14, further comprising:

controlling the differential limiting device so as to release the differential device from a locked condition before it releases a further differential device from a locked condition.

16. A method of controlling according to claim 13, further comprising:

controlling the vehicle by at least one of increasing a differential limit of the differential limiting device and prohibiting power from being transmitted to the differential device following receipt of the signal indicating failure.

17. A method of controlling according to claim 13, further comprising:

increasing a brake force after the antiskid brake control device receives the signal from the differential control device for indicating failure.

18. A method of controlling according to claim 16, further comprising:

changing a threshold of the antiskid brake control device so as to shift the threshold from a starting value to a second threshold value when the antiskid brake control device receives the signal indicating failure from the differential control device.

19. A method of controlling according to claim 13, further comprising:

prohibiting antiskid brake control following receipt of the signal indicating failure from the differential control device.

20. A control device for an automotive vehicle comprising:

an antiskid brake control device for controlling an antiskid brake device; and a differential control device for controlling a differential limiting device;

wherein upon a failure of one component operatively associated with one of said antiskid brake control device or said differential control device, the other control device receives a signal indicating a failure from said antiskid brake control device or said differential control device, and then the other control device assumes control of the control device experiencing a failure in said one component, and wherein following receipt of the signal indicating a failure, the differential control device controls said differential limiting device so as to prohibit power from being transmitted to said differential device; and further comprising a plurality of differential devices, and wherein said differential control device controls said differential limiting device so as to release one differential device from a locked condition before it releases another differential device from a locked condition.

21. A method of controlling a vehicle comprising:

controlling an antiskid brake device by using an antiskid brake control device; and controlling a differential limiting device by using a differential control device;

issuing a signal indicating failure of one component operatively associated with one of the antiskid brake control device or the differential control device such that the other control device receives a signal indicating the failure from the antiskid brake control device or the differential control device;

controlling the control device experiencing a failure in the one component by using the other control device;

controlling the differential limiting device so as to prohibit power from being transmitted to the differential device following receipt of the signal indicating a failure; and controlling the differential limiting device so as to release the differential device from a locked condition before it releases a further differential device from a locked condition.

* * * * *